(12) United States Patent
Chitalia et al.

(10) Patent No.: US 11,989,719 B2
(45) Date of Patent: *May 21, 2024

(54) ADAPTABLE AUTHENTICATION PROCESSING

(71) Applicant: Visa International Service Association, San Francisco, CA (US)

(72) Inventors: Jalpesh Chitalia, San Francisco, CA (US); Thomas Purves, San Francisco, CA (US); Ansar Ansari, San Ramon, CA (US); Vishwanath Shastry, Mountain View, CA (US); Otto Williams, Dublin, CA (US); Kevin Carvalho, Sunnyvale, CA (US); Madhuri Chandoor, San Jose, CA (US); Amit Gupta, San Francisco, CA (US); Manoj Kannembath, San Francisco, CA (US); Samuel Blake Shrauger, Lafayette, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/707,751

(22) Filed: Mar. 29, 2022

(65) Prior Publication Data

US 2022/0237592 A1 Jul. 28, 2022

Related U.S. Application Data

(63) Continuation of application No. 15/466,815, filed on Mar. 22, 2017, now Pat. No. 11,321,707.

(Continued)

(51) Int. Cl.
*G06Q 20/36* (2012.01)
*G06Q 20/20* (2012.01)
*G06Q 20/40* (2012.01)

(52) U.S. Cl.
CPC ............. *G06Q 20/36* (2013.01); *G06Q 20/20* (2013.01); *G06Q 20/3674* (2013.01); *G06Q 20/40145* (2013.01)

(58) Field of Classification Search
None
See application file for complete search history.

(56) References Cited

U.S. PATENT DOCUMENTS 8,736,740 B2 5/2014 Ogino
11,049,101 B2 6/2021 Ansari et al.
(Continued)

FOREIGN PATENT DOCUMENTS

CN 1313973 9/2001
CN 1376292 10/2002
(Continued)

OTHER PUBLICATIONS

"Host Card Emulation, 2014, White Paper Smart Card Alliance, 10-11" (Year: 2014).*

(Continued)

*Primary Examiner* — Christopher Bridges
*Assistant Examiner* — Toan Duc Bui
(74) *Attorney, Agent, or Firm* — Kilpatrick Townsend & Stockton LLP

(57) ABSTRACT

Embodiments of the invention are directed to systems and methods that enable authentication of a user via an authentication application that is different than a wallet application that is being used to process a transaction. The wallet application may contain payment devices and/additional wallet applications.

20 Claims, 14 Drawing Sheets

Related U.S. Application Data

(60) Provisional application No. 62/411,587, filed on Oct. 22, 2016, provisional application No. 62/311,824, filed on Mar. 22, 2016.

(56) References Cited

U.S. PATENT DOCUMENTS

| | | | |
|---|---|---|---|
| 11,321,707 | B2 | 5/2022 | Chitalia et al. |
| 2003/0208684 | A1 | 11/2003 | Camacho et al. |
| 2004/0030659 | A1 | 2/2004 | Gueh |
| 2006/0041507 | A1 | 2/2006 | Novack et al. |
| 2008/0180212 | A1* | 7/2008 | Aikawa .................. G07C 9/257 340/5.83 |
| 2009/0192904 | A1 | 7/2009 | Patterson et al. |
| 2009/0240760 | A1 | 9/2009 | McDougle |
| 2009/0319425 | A1 | 12/2009 | Tumminaro et al. |
| 2010/0063935 | A1 | 3/2010 | Thomas et al. |
| 2011/0035319 | A1 | 2/2011 | Brand et al. |
| 2011/0093397 | A1 | 4/2011 | Carlson et al. |
| 2011/0106674 | A1 | 5/2011 | Perlman et al. |
| 2012/0011066 | A1 | 1/2012 | Telle et al. |
| 2012/0095852 | A1 | 4/2012 | Bauer et al. |
| 2012/0143752 | A1* | 6/2012 | Wong ....................... H04L 63/10 705/41 |
| 2012/0246079 | A1* | 9/2012 | Wilson ................ H04W 12/062 705/67 |
| 2013/0013509 | A1 | 1/2013 | Perlman et al. |
| 2013/0054454 | A1 | 2/2013 | Purves et al. |
| 2013/0055362 | A1 | 2/2013 | Rathbun |
| 2013/0226792 | A1 | 8/2013 | Kushevsky et al. |
| 2013/0254115 | A1 | 9/2013 | Pasa et al. |
| 2013/0268437 | A1* | 10/2013 | Desai .................. G06Q 20/3674 705/41 |
| 2013/0346313 | A1 | 12/2013 | Wankmueller |
| 2014/0012758 | A1 | 1/2014 | Keresman, III et al. |
| 2014/0019352 | A1 | 1/2014 | Shrivastava |
| 2014/0164254 | A1* | 6/2014 | Dimmick ............... G06Q 20/36 705/44 |
| 2014/0222616 | A1 | 8/2014 | Siemiatkowski et al. |
| 2014/0258125 | A1 | 9/2014 | Gerber et al. |
| 2014/0304162 | A1 | 10/2014 | Pereira |
| 2015/0058931 | A1 | 2/2015 | Miu et al. |
| 2015/0066691 | A1* | 3/2015 | Ready ................. G06Q 30/0633 705/26.8 |
| 2015/0088754 | A1 | 3/2015 | Kirsch |
| 2015/0120559 | A1 | 4/2015 | Fisher et al. |
| 2015/0143106 | A1 | 5/2015 | Wentker et al. |
| 2015/0154588 | A1 | 6/2015 | Purves et al. |
| 2015/0186890 | A1 | 7/2015 | Li et al. |
| 2015/0213542 | A1 | 7/2015 | Wallaja |
| 2015/0327072 | A1* | 11/2015 | Powell .................... G06Q 20/40 455/411 |
| 2015/0339659 | A1 | 11/2015 | Ballesteros |
| 2016/0004857 | A1 | 1/2016 | Chen |
| 2016/0005038 | A1 | 1/2016 | Kamal et al. |
| 2016/0086453 | A1 | 3/2016 | Cage et al. |
| 2016/0094991 | A1* | 3/2016 | Powell ................... H04W 12/06 455/411 |
| 2016/0148201 | A1* | 5/2016 | Kadaster .............. G06Q 20/425 705/44 |
| 2016/0182523 | A1 | 6/2016 | Pelegero et al. |
| 2016/0358178 | A1 | 12/2016 | Ghosh et al. |
| 2016/0359850 | A1 | 12/2016 | Weiss |
| 2017/0004136 | A1 | 1/2017 | Cassel et al. |
| 2017/0193504 | A1* | 7/2017 | Godsey ................ G06Q 20/363 |
| 2017/0278096 | A1 | 9/2017 | Chitalia et al. |
| 2017/0344729 | A1 | 11/2017 | Kohli |
| 2017/0366530 | A1 | 12/2017 | Dominguez et al. |
| 2017/0372301 | A1 | 12/2017 | Theurer et al. |
| 2018/0041518 | A1 | 2/2018 | Jacobs et al. |
| 2018/0225671 | A1 | 8/2018 | Brown |
| 2018/0234418 | A1 | 8/2018 | Brown |

FOREIGN PATENT DOCUMENTS

| | | |
|---|---|---|
| CN | 1602491 | 3/2005 |
| CN | 1791887 | 6/2006 |
| CN | 103765453 | 4/2014 |
| CN | 104838399 | 8/2015 |
| CN | 105051768 | 11/2015 |
| CN | 105359178 | 2/2016 |
| CN | 106022754 | 10/2016 |
| KR | 1020160013221 | 2/2016 |
| WO | 2017165576 | 9/2017 |

OTHER PUBLICATIONS

"Apple Pay", Available Online at: https://en.wikipedia.org/w/index.php?title=Apple_Pay&oldid=711168598, Mar. 21, 2016, 7 pages.

"Disable Chrome From Asking Windows User Login Password", Available Online at: http://web.archive.org/web/20160307185649/https://www.trishtech.com/2014/09/disable-chrome-from-asking-windows-user-login-password/, Mar. 7, 2016, 2 pages.

EP17771105.8 , "Summons to Attend Oral Proceedings", Jun. 24, 2022, 12 pages.

U.S. Appl. No. 15/466,815 , "Corrected Notice of Allowability", dated Apr. 1, 2022, 3 pages.

Application No. CN201780019079.4 , Office Action, dated Apr. 8, 2022, 8 pages.

Kadir et al., "Application of NFC Technology for Premise Halal Certification", 3rd International Conference on Information and Communication Technology (ICoICT), May 27-29, 2015—Abstract submitted.

"Host Card Emulation", White Paper Smart Card Alliance, Available Online at URL: https://www.securetechalliance.org/wp-content/uploads/HCE-101-WP-FINAL-081114-clean.pdf, Aug. 2014, 32 pages.

"Report of the US Secretary of Treasury to US Congress", Nov. 2002, 47 pages.

"Report to US Congress submitted by US Treasury Secretary, Board of Governors of the Federal Reserve System, and the Securities and Exchange Commission", Dec. 31, 2002, 40 pages.

U.S. Appl. No. 15/466,815 , Final Office Action, dated Nov. 26, 2019, 17 pages.

U.S. Appl. No. 15/466,815 , Final Office Action, dated Dec. 21, 2020, 21 pages.

U.S. Appl. No. 15/466,815 , Non-Final Office Action, dated Sep. 1, 2020, 13 pages.

U.S. Appl. No. 15/466,815 , Non-Final Office Action, dated Jun. 7, 2019, 16 pages.

U.S. Appl. No. 15/466,815 , Non-Final Office Action, dated Aug. 31, 2021, 18 pages.

U.S. Appl. No. 15/466,815 , Notice of Allowance, dated Feb. 10, 2022, 10 pages.

U.S. Appl. No. 15/927,754 , Advisory Action, dated May 26, 2020, 5 pages.

U.S. Appl. No. 15/927,754 , Final Office Action, dated Mar. 3, 2020, 28 pages.

U.S. Appl. No. 15/927,754 , Final Office Action, dated Dec. 14, 2020, 31 pages.

U.S. Appl. No. 15/927,754 , Non-Final Office Action, dated Sep. 6, 2019, 25 pages.

U.S. Appl. No. 15/927,754 , Non-Final Office Action, dated Jun. 24, 2020, 29 pages.

U.S. Appl. No. 15/927,754 , Notice of Allowance, dated Mar. 1, 2021, 18 pages.

Cassara , "Managing Terrorism Financing Risk in Remittances and Money Transfers", Testimony by John Cassara, Jul. 18, 2017, 113 pages.

Application No. CN201780019079.4 , Office Action, dated Aug. 27, 2021, 19 pages.

Application No. EP17771105.8 , Extended European Search Report, dated Mar. 19, 2019, 8 pages.

Application No. EP17771105.8 , Office Action, dated Feb. 1, 2021, 7 pages.

IN201847038989 , "First Examination Report", dated Jun. 29, 2021, 7 pages.

(56) References Cited

OTHER PUBLICATIONS

Jost et al., "The Hawala Alternative Remittance System and Its Role in Money Laundering", Prepared by the Financial Crimes Enforcement Network in cooperation with INTERPOL/FOPAC, Jan. 2000, pp. 279-305.
Application No. PCT/US2017/023686 , International Search Report and Written Opinion, dated Jun. 30, 2017, 13 pages.
Thomoson , "Misplaced Blame: Islam, Terrorism and the Origins of Hawala", Max Planck UN Year Book vol. 11, No. 1, 2007, pp. 279-305.

* cited by examiner

ADAPTABLE AUTHENTICATION PROCESSING

CROSS-REFERENCES TO RELATED APPLICATIONS

This application is a continuation of U.S. non-provisional application Ser. No. 15/466,815 filed Mar. 22, 2017, which is a non-provisional application of U.S. non-provisional application No. 62/311,824, filed on Mar. 22, 2016, and 62/411,587, filed on Oct. 22, 2016, each of which are herein incorporated by reference in their entirety for all purposes.

BACKGROUND

Conventional wallet providers host digital wallets, which allow users to store a number of different accounts in them. A typical digital wallet that is hosted on a wallet provider server computer may be used in the following manner. A user visit a merchant's Website, may select a number of items for purchase, and may be ready to pay. An option for the digital wallet may be presented to the user along with other payment options. The user may select the digital wallet, and may log into his or her digital wallet using standard credentials including a username and password. The user may be prompted to enter the credentials via a pop up window on a merchant's Website. Once the user has entered the credentials, the user may be allowed to select credit card account or other account to allow the user to pay for the items.

While effective, a number of problems exist in conventional digital wallet providers. For example, digital wallets allow for only one way to authenticate the user. For example, in the above example, a user needs to provide a username and password. While this level of security might be sufficient for the digital wallet provider, it may be insufficient for other entities that might have an interest in ensuring that the payment transaction is secure. This can be an issue, especially when the digital wallet may link to different payment sources, and may be used with different merchants.

Embodiments of the invention address these and other problems, individually and collectively.

SUMMARY

Embodiments of the invention include the use of an authentication application that is separate from a wallet application on a computing device that is being used by a user to conduct a transaction with a merchant Website. The authentication application need not be affiliated or related to the wallet application, and can reside on the computing device, or a different computing device. The different computing device can be an external server such as another wallet server, or it may be another device that the user operates.

One embodiment of the invention is directed to a method comprising: displaying a merchant checkout page provided by a merchant server, the merchant checkout page comprising a wallet provider checkout element; receiving, by the computing device, a selection of the wallet provider checkout element associated with a remotely located wallet provider server computer; after receiving the selection of the wallet provider checkout element, initiating, by a wallet application on the computing device, an authentication application, which is separate from the wallet application, on the computing device or on a different computing device; displaying, by the authentication application, an authentication prompt; receiving, by one or more input elements in the computing device, an authentication input; determining, by the computing device, that the authentication input is authentic; displaying, by the computing device, a payment account stored at the wallet provider server computer; receiving, by the one more input elements, a selection of the payment account; and communicating, by the computing device, payment account information associated with the selected payment account to the wallet provider server computer, wherein the wallet provider server computer provides the payment account information to the merchant server.

Another embodiment of the invention is directed to a computing device configured to perform the above-noted method.

Another embodiment of the invention is directed to a method comprising: receiving payment information in a wallet application payment information format by a remote wallet provider server computer from a wallet application (e.g., a multi-wallet application) on a computing device; determining, by the remote wallet provider server computer, a merchant payment information format for a merchant server computer; converting the payment information into the merchant payment information format; and providing the payment information to the merchant server computer in the merchant payment information format.

In some embodiments, the computing device can provide transaction information received from a merchant to a second wallet provider application associated with a second wallet provider server computer. The wallet application may be instantiated (e.g., executed on the computing device) and provided with the transaction information. The wallet application may be provided with information by a first wallet application (e.g., a multi-wallet application) associated with a first wallet provider server computer. In these embodiments, the first wallet application may appear to the second wallet application as the merchant in the transaction. In some embodiments, this may be initiated by selecting an option to use a payment device associated with a first wallet application and subsequently selecting the second wallet application from a number of wallet applications. The second wallet application may separately authenticate the user of the computing device using any authentication techniques typically employed by the second wallet application (e.g., using biometric data, password login, or any other suitable authentication channel). Thus, in this example, the second wallet application may be an authentication application since it is authenticating the user of the computing device.

Once the user has been authenticated, the second wallet application may determine whether to initiate the transaction or not based on the transaction information provided. In some embodiments, the second wallet application may provide a token, instead of a real account number to complete the transaction. The first wallet application may then generate transaction information to be provided to the merchant that includes the token. For example, the transaction may include a primary account number (PAN) associated with the first wallet application, whereas the token may be included in a payload of the transaction information.

The merchant (or an acquirer associated with the merchant) may then use the transaction information to complete the transaction. For example, the merchant (or the acquirer associated with the merchant) may generate an authorization request to be routed to processing network, which may retrieve a real account number associated with the token and may modify the authorization request message to include the real account number instead of the token. The modified authorization request message may then be sent to an authorizing computer for authorization. The authorizing computer may respond with an authorization response message. In another example, the authorization request message with the token may be transmitted to the appropriate wallet provider server computer (e.g., the second wallet provider server computer). Once the second wallet provider server computer receives the authorization request message, it may send it on to the authorizing computer as described above. In the latter example, the merchant may perceive the transaction as being conducted using a payment account associated with the first wallet application, and may not be made aware of the second wallet application's involvement in the transaction.

Further details regarding embodiments of the invention can be found in the Detailed Description and the Figures.

DETAILED DESCRIPTION

Figure 1:
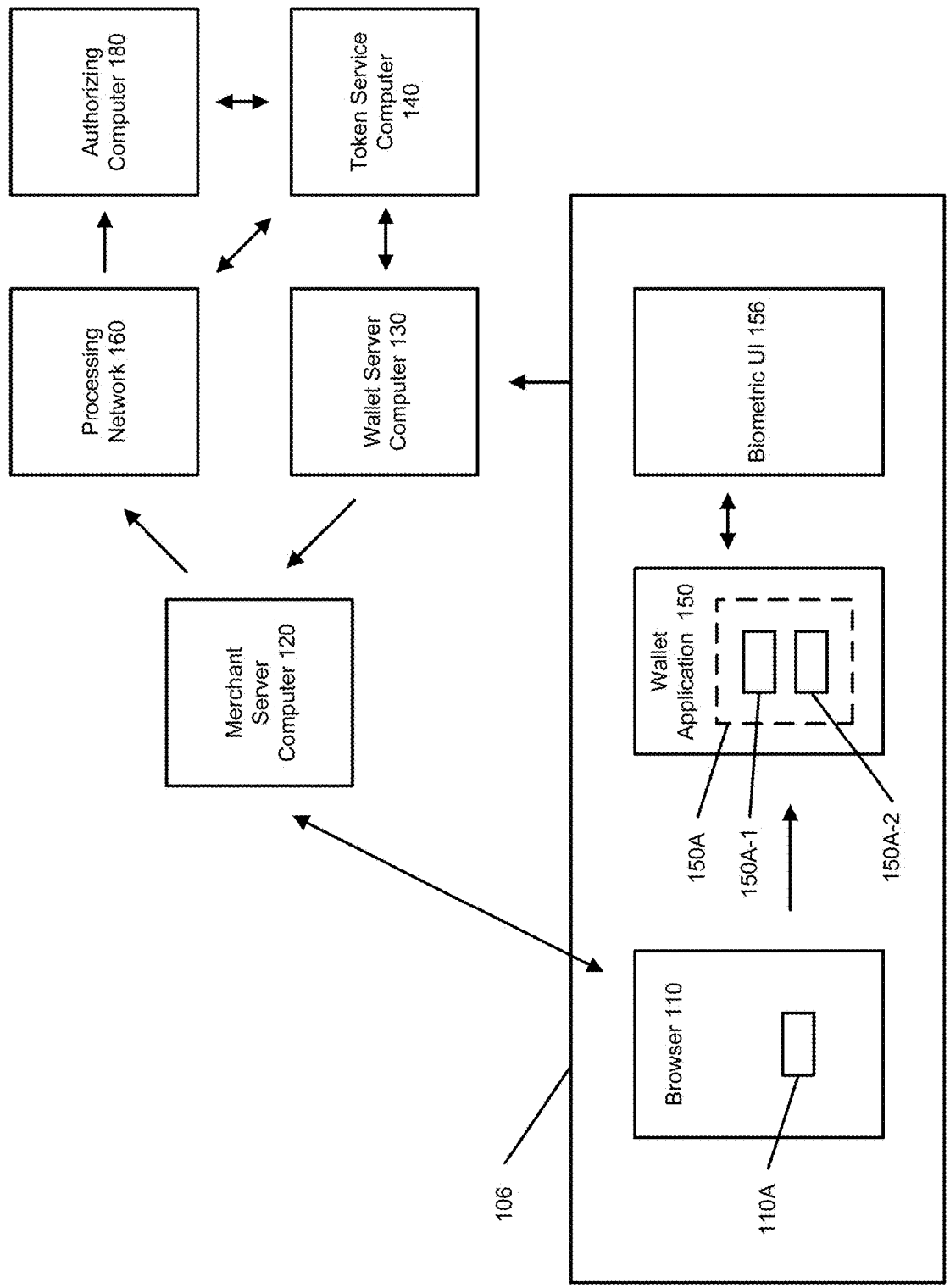
FIG. 1 is a block diagram illustrating parts of a system according to an embodiment of the invention.

Embodiments of the invention enable new computer architectures and methods where local wallet applications are on one side of a network, and e-commerce merchants are on the other side of the network. In such an arrangement, (a) participant merchants (or their agents such as payment gateways or acquirers) implement to a processing network specification for e-commerce enablement, (b) participating wallets would implement to the processing network specification for a checkout flow and experience, and (c) participating issuers, optionally, send cards to the processing network so that their cardholder data is automatically provisioned for payments in a specified subset of wallets.

In embodiments of the invention, while issuers may enroll PANs and cardholders onto the processing network, cardholders may register their PANs into the network via other network participants including wallets (during provisioning flows), merchants (during payments), and directly on the processing network.

Prior to discussing specific embodiments of the invention, some terms may be described in detail.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authentication indicator" may be any suitable piece of data that provides additional proof that a particular circumstance is authentic. Exemplary authentication indictors may include cryptograms, flags, or other data which can indicate that the user was authenticated by a computing device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements including one or more of: a service code, a CW (card verification value), a dCW (dynamic card verification value), a PAN (primary account number or "account number"), a payment token, a user name, an expiration date, etc.

An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the user.

A "computing device" may include any suitable device that can electronically process data. Examples of computing devices include desktop computers, mobile devices or mobile computing devices, television sets, etc.

A "mobile device" or "mobile computing device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "token" may be a substitute value for a credential. A token may be a string of numbers, letters, or any other suitable characters. Examples of tokens include payment tokens, access tokens, personal identification tokens, etc.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include one or more computers that service payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "user" may include an individual. In some embodiments, a user may be associated with one or more personal accounts and/or mobile devices. The user may also be referred to as a cardholder, account holder, or consumer.

FIG. 1 shows a system comprising a number of components. FIG. 1 shows a computing device 106, which can be in communication with a merchant server 120. The merchant server computer 120 may serve one or more pages of a merchant Web site to a browser 110 on the computing device 106. The merchant server computer 120 may also be in communication with a wallet server computer 130 and a processing network 160. The wallet server computer 130 may be in communication with a token service computer 140, and the processing network 160 may be in communication with an authorizing computer 180. Any or all of the computers in FIG. 1 may be embodied by cloud based systems or non-cloud based systems.

The computing device 106 may include a browser 110, a wallet application 150, and a biometric user interface 156 (an example of an authentication user interface). The wallet application 150 may be a trusted application, which may include account identifiers for many accounts, and/or include links to many different wallet provider server computers, which may themselves store many account identifiers. The wallet application on the computing device 106 may be configured to operate independently of the wallet server computer 130 in some instances and may be run by a different entity (e.g., organization) than the wallet server computer 130.

In some embodiments of the invention, the computing device 106 may be a mobile device such as a mobile phone. The mobile device may be able to communicate with cell towers (e.g., via cellular communications such as GSM, LTE, 4G) and wireless routers (e.g., via WiFi). The mobile device may store the user's payment credentials, such as a PAN (primary account number), a payment token, a name, an address, a CVV, an expiration date, and any other suitable information. Such data may be securely stored via hardware (e.g., a secure element) or software.

The wallet application 150 which may include information about one or more user payment accounts. The user can add payment accounts, set a default account, prepare the mobile device for a payment, and perform other payment-related functions via the digital wallet application. In some embodiments, different payments account at the digital wallet application may be associated with different authentication applications, and each authentication application may be associated with an Application Identifier (AID). As noted above, the wallet application 150 may also be associated with or be in communication with multiple other wallet provider server computers (not shown in FIG. 1).

The system in FIG. 1 also shows a token service computer 140. The token service computer 140 may be operated by a token service provider, and may be in communication with or may be incorporated within the processing network 160. In some embodiments, the token service computer 140 may also be used to provide the computing device 106 with a token.

A user can use the computing device 106 to conduct an e-commerce transaction using a merchant Web site operated by the merchant server computer 120 using the browser 110. The browser 110 may show a wallet provider checkout element 110A. The wallet provider checkout element 110A may be selected and may cause the computing device 106 to interact with the wallet server computer 130. In some embodiments, the wallet checkout element 110A may be in the form of a merchant checkout button with a logo or other indicator on the side which shows that it is affiliated with the wallet server computer 130.

After the wallet provider checkout element 110A is selected, instead of rendering a checkout user interface (UI) in the browser 110 as is conventionally done in remote wallet transactions, the wallet application 150 can invoke an authentication process. The authentication process cause the computing device 106 (or a different computing device—as described below in FIG. 3) to invoke an authentication application, which can cause an authentication UI 156 to be displayed. In this example, the authentication UI 156 may be a prompt for the user to put his or her fingerprint (or other authentication data) on the fingerprint scanner on the computing device 106.

The authentication application can be tied to hardware on the computing device 106. Examples of authentication applications can include fingerprint, retinal, or voice scanning applications. The hardware associated with those applications may include fingerprint, retinal, or voice scanning hardware such as fingerprint, retinal, or voice sensors. Other types of authentication applications may also include PIN and password authentication applications.

After the user has been authenticated by the authentication application on the computing device 106, the wallet application 150 may display one or more accounts 150A-1 and a shipping address 150A-2 (and/or billing address) in a container 150A.

The user may then select the account 150A-1 to conduct the purchase transaction. Once this occurs, the computing device 106 may retrieve an account number, token, or other account identifier stored in a memory in the computing device 106 as well as an authentication indicator such as an authentication cryptogram. The authentication indicator may be generated after the authentication hardware in the computing device 106 successfully authenticates the user.

At this point, the authentication indicator and the account identifier are transmitted to the wallet server computer 130, along with any other data that can be used to identify the transaction (e.g., a transaction ID) and/or merchant (e.g., a merchant ID). The wallet server computer 130 may then analyze the data that it receives, and may the determine the appropriate type of data format that the merchant server computer 120 can receive. To accomplish this, the wallet server computer 130 may store a data table with the data processing formats used by the various merchants that it interacts with, and also data processing formats associated with the various authentication applications or wallet applications that it interacts with.

It is noted that in some embodiments, the user need not provide any specific login information for the wallet server computer 130 to use the wallet server computer 130. The user's authenticity may have been verified by the authentication application on the computing device 106.

As an illustration, the wallet server computer 130 may determine that the merchant server computer 120 can use payment tokens. Thus, after receiving an account identifier such as a real PAN or a device ID from the computing device 106, the wallet server computer 130 may contact the token service computer 140 to obtain a payment token, and this payment token may be forwarded to the merchant server computer 120 along with the previously described authentication indicator. The authentication indicator may be used by the wallet server computer 130, the merchant server computer 120, the processing network 160, and/or the authorizing computer 180 as assurance that the user has been authenticated.

The merchant server computer 120 may generate an authorization request message and may transmit it to the processing network 160 and the authorizing computer 180 for authorization. A transport computer such as an acquirer computer may be present between the merchant server computer 120 and the processing network 160. At any time, the processing network 160 and/or the authorizing computer 180 may resolve the payment token into a real PAN and may determine if the transaction is authorized. After an authorization decision is made, a return authorization response message may be sent from the authorizing computer 180 to the merchant server computer 120 completing the transaction. A clearing and settlement process may take place afterwards.

In another illustration, the computing device 106 may send a payment token and authentication indicator to the wallet server computer 130, but it may determine that the merchant server computer 120 is not configured to receive payment tokens or authentication indicators. The wallet server computer 130 could translate the token into a real PAN and could omit the authentication indicator so that the merchant server computer 120 can process the transaction. Authorization request and response messages may then be sent between the merchant server computer 120 and the authorizing computer 180, and settlement and clearing can take place as described above.

In yet other embodiments of the invention, the wallet server computer 130 may invoke additional authentication processes such as 3D Secure or Verified by Visa™ if the merchant server computer 120 is compatible with such authentication processes.

Thus, in such embodiments, the wallet server computer 130 can act as a hub that provides compatibility between various computer devices with various authentication applications, and various merchant server computers with various payment information acceptance configurations.

Figure 2:
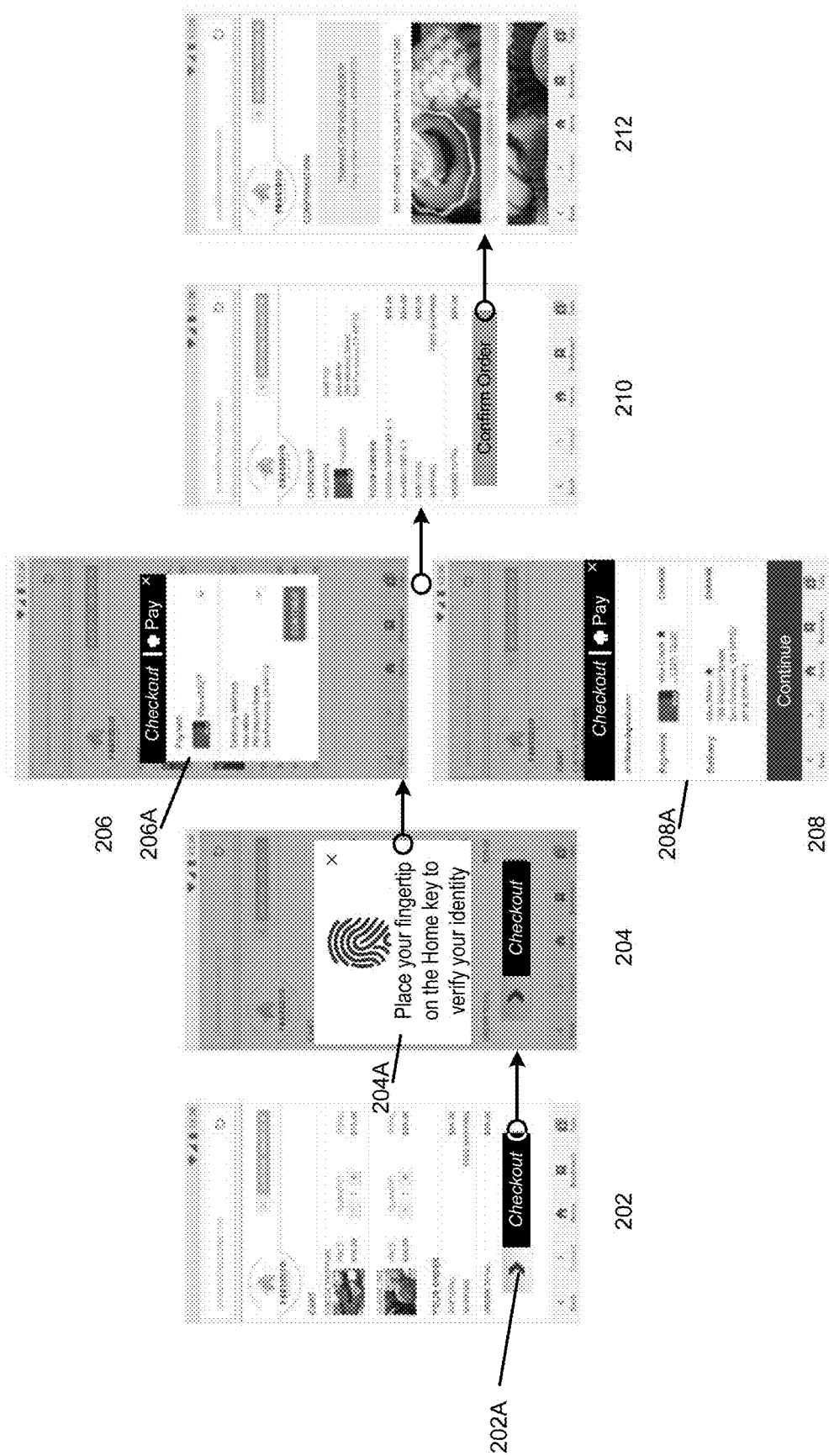
FIG. 2 shows a user interface flow according to embodiments of the invention.

FIG. 2 shows a user interface flow that can be used in embodiments of the invention. In FIG. 2, an authentication technique may be performed by a wallet application in accordance with requirements set forth by that wallet application.

Element 202 illustrates a browser with a merchant checkout page having a wallet provider checkout element 202A. The wallet provider checkout element 202A may be implemented via a graphical user interface (GUI) maintained and/or operated by a wallet application. Upon selection of the wallet provider checkout element 202A, the GUI may be caused to execute a corresponding wallet application (e.g., by starting up an instance of the wallet application). In some embodiments, a user of the GUI may be asked to select an appropriate wallet application from a number of available wallet applications. Control may then be given to the wallet application in order to at least partially complete the transaction.

Element 204 illustrates a biometric authentication prompt 204A caused by an authentication application that may be used with some instances of wallet applications. In some embodiments, the merchant checkout page may be blocked to prevent completion of a transaction until the authentication prompt 204A is addressed. For example, to continue, the user may be informed that he or she needs to provide biometric information (e.g., a fingerprint) to the computing device. In some embodiments, the authentication prompt 204A may provide instructions to perform any one or a combination of actions related to authentication of the user.

Elements 206 and 208 illustrate containers 206A and 208A, which include account identifiers and shipping addresses. In some embodiments, each of the containers 206A and 208A may include a number of different account identifiers and/or shipping addresses. In some embodiments, each of containers 206A and 208A may be implemented by the same or separate wallet applications. Hence, the container 206A or 208A presented to a particular user may be based on the wallet application selected upon selection of element 202A. Within containers 206A and 208A, the user may select an account identifier from one or more account identifiers and/or a shipping address from one or more shipping addresses. Account data and/or shipping address information may be stored in the wallet server computer associated with the corresponding wallet application.

Element 210 illustrates a browser on the merchant Web site after the merchant has received the payment information from the wallet server computer. In some embodiments, upon completion of the authentication process using the wallet application, the wallet application may aggregate and present information related to the transaction to the user via the browser. Upon selection of a confirmation by the user, the wallet application may initiate the process of determining whether the user has sufficient funds and/or credit to perform the transaction. Upon making this determination, the wallet application may initiate the determination of whether to approve or decline the transaction (e.g., provide a pre-approval). In some embodiments, once the authentication application has authenticated the user, and if the authentication application resides on another device external to the computing device, the external computing device may generate or obtain a token for completing the transaction. The external computing device may then provide the token to the wallet application on the computing device to initiate the process of determining whether to approve or decline the payment transaction.

It is noted that the wallet application on the computing device may be in communication with a wallet provider server computer, which provides support for the wallet application during one or more of the described steps of FIG. 2. Accordingly, details of the transaction to be conducted by the user may be relayed to the wallet provider server computer.

Element 212 illustrates a browser with an order completion after the merchant Web site has processed the payment.

Figure 3:
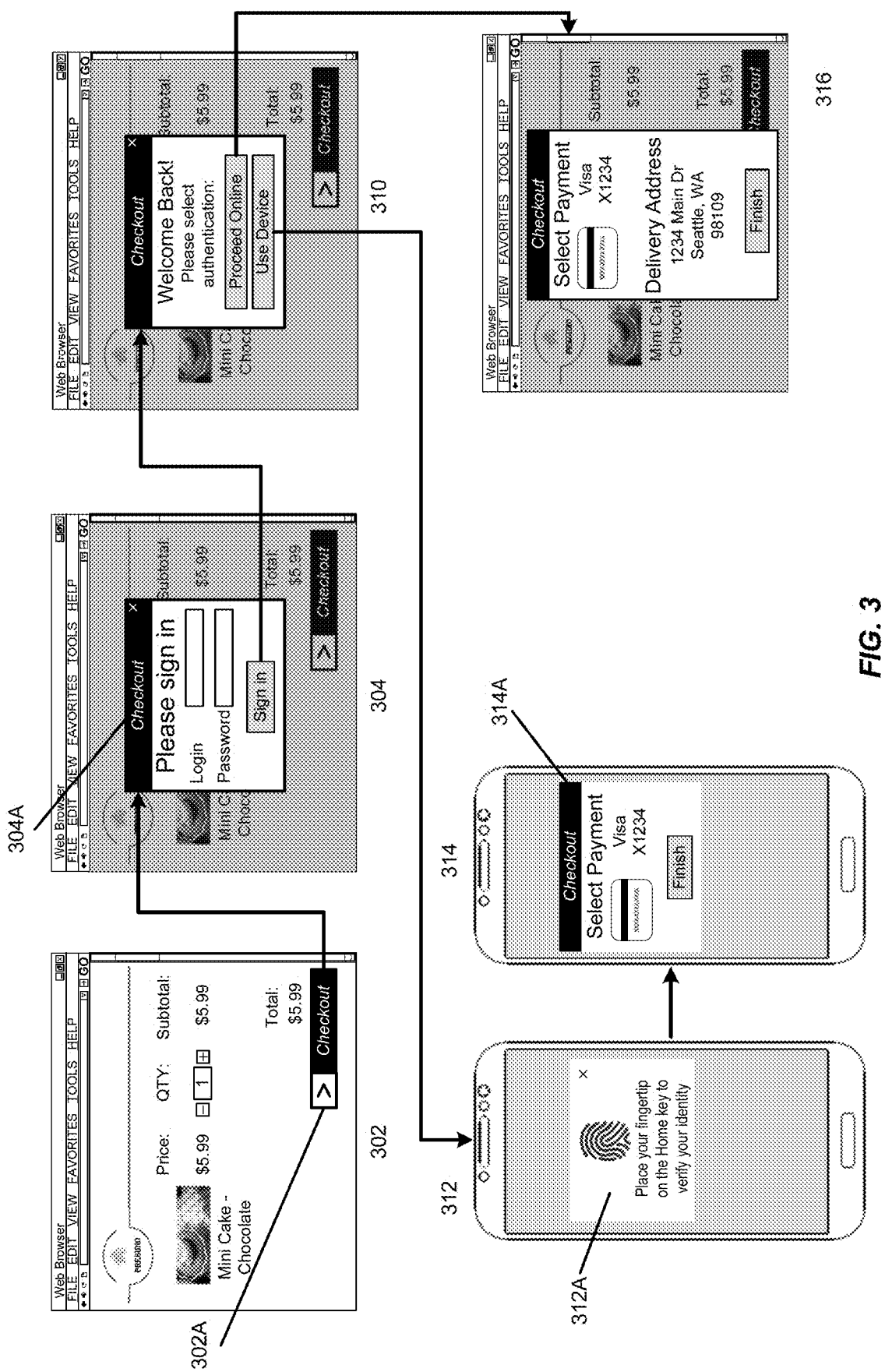
FIG. 3 shows another user interface flow that can be used in embodiments of the invention.

FIG. 3 shows another user interface flow that can be used in embodiments of the invention. The user interface flow in FIG. 3 utilizes two computing devices, instead of one computing device as in FIG. 2. In accordance with at least some embodiments, one of the two computing devices may be a personal computing device (e.g., a laptop or desktop computer) whereas the second of the two computing devices may be a mobile computing device (e.g., a mobile phone, smart phone, personal data assistant (PDA), or another suitable mobile computing device). In some embodiments, the mobile computing device may be associated with a particular user. For example, one or more servers may store an indication of a relationship between the mobile computing device and the user.

In some embodiments, a user may navigate to a merchant's webpage in order to conduct a transaction. For example, the merchant may be an online retailer which maintains an electronic catalog of items. In this example, the user may select one or more of the items for purchase. Element 302 illustrates a browser with a merchant checkout page having a wallet application checkout element 302A. In some embodiments, the merchant checkout page 302 may include a number of payment options for completing the transaction, of which the wallet application checkout element 302A may be one. For example, the merchant checkout page may include a number of payment options that represent payment devices which the merchant is capable of accepting. Upon selection of a particular option within the merchant checkout page, the merchant may be configured to conduct the transaction using the selected option.

In the scenario presented above, selection of the wallet application checkout element 302A from the presented options may result in requiring the user to sign in to an account maintained by the wallet application. Element 304 depicts an example prompt that may be provided for the user to sign into an account associated with the wallet server provider computer using a pop up window 304A. Upon signing into an account maintained by the wallet provider server computer, the wallet provider server computer may identify payment devices associated with that account. Additionally, the wallet provider server computer may identify a mobile computing device associated with the user based on the received login information. In some embodiments, at least some of the identified payment devices may support payment made using a mobile application associated with the user.

Element 310 provides another prompt which asks the user if she wants to continue processing the transaction using a payment device maintained by a wallet provider server computer, or using a wallet application installed on the user's mobile device.

User interfaces 312 and/or 314 may then be presented to the user. User interface 312 depicts a prompt 312A requesting biometric authorization as described above, and user interface 314 depicts a container 314A with one or more account identifiers and shipping addresses. The user may then select an account identifier and shipping address and a transaction may be processed as described above.

In this example, because the user has provided login information (e.g., an e-mail address), and because the wallet service provider computer is capable of mapping the login information to the user's mobile phone, the user's mobile phone may receive instructions to display user interfaces 312 and 314, while the user's original computer device such as a laptop or desktop computer may display elements 302, 304, and 310 (and 316). Thus, in this example two different devices may be used to complete an e-commerce transaction.

With reference to element 316, if the user chooses to use the wallet service provider computer to process the transaction (i.e., without using the wallet application installed on the mobile computing device), then the user may be provided a list of supported payment devices.

Figure 4:
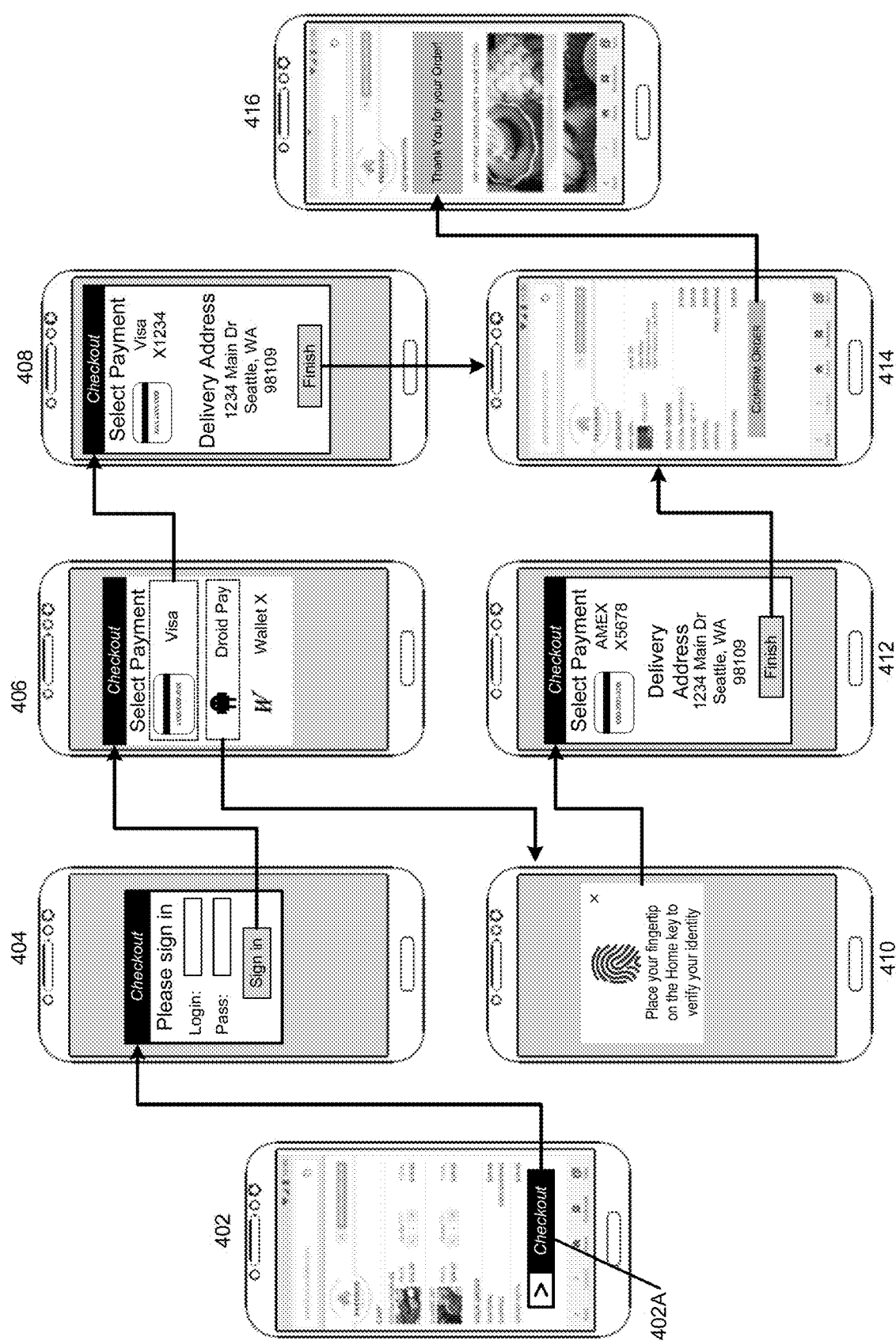
FIG. 4 depicts separate flows that may be implemented on the same device using a wallet application.

FIG. 4 depicts separate flows that may be implemented on the same device using a wallet application in accordance with some embodiments. One flow may be associated with a traditional payment device checkout process, whereas the other flow may use a wallet application.

Element 402 provides a checkout element 402A on a merchant checkout page shown in a browser of a computing device. In some embodiments, checkout element 402A may be associated with a wallet application installed on, and executed from, a computing device from which the merchant page has been visited. In some embodiments, the checkout element 402A may be a button or other activation mechanism located within a webpage accessed using the computing device. In some embodiments, the checkout element 402A may be presented alongside a number of payment options available via the merchant. In some embodiments, the checkout element 402A may be an icon appended to the browser application (e.g., via a widget or other add-on) which may be used to initiate completion of a transaction.

As depicted at 404, a user may be prompted to log in to an account maintained by a server upon activation of the checkout element 402A. Based on the login information provided, the server may identify information associated with the user. For example, the server may identify a mobile computing device associated with the user based on the user information provided.

Upon login, the user may be provided a list of payment options available to that user as depicted at 406. In some embodiments, the list of payment options may be an aggregated list of wallet services and other payment devices known to be associated with the user. Some of the payment options may represent wallet applications or other token services and some of the payment options may represent issuer-supported payment device options (e.g., credit cards). For example, applications installed on a mobile computing device belonging to the user may identify cookies on the mobile computing device. In some embodiments, the wallet application may identify information within the one or more cookies to be sent to a server that supports the one or more application associated with the cookies. In another example, the user may add a payment option to his or her account using an enrollment process.

If the user chooses an issuer-supported payment device option, then the server may confirm a specific account and shipping information for the selected payment device at 408. The wallet provider server computer may also retrieve a PAN associated with the selected payment device option. In this scenario, the account to which the user logged in may be associated with a master PAN, or a PAN associated with the server itself and the account. Upon selection of an issuer-supported payment device option, the server may generate transaction information that includes the master PAN as the account to be used for payment and the PAN associated with the selected payment device within the payload of the transaction information. The generated transaction information may then be provided to the merchant during checkout such that an authorization request generated for the transaction is subsequently routed to the server during authorization. The server is then able to identify the issuer-supported payment device from the PAN provided in the payload.

Upon selection of a second wallet application for payment, the selected second wallet application may be opened. In some embodiments, the selection of the second wallet application by the user may cause instructions to be executed on the computing device to open the selected second wallet application and push the transaction information to the first wallet application for approval. In some embodiments, the second wallet application may receive information from the first wallet application that indicates the first application is the merchant in the transaction instead of the actual merchant.

Upon execution of a selected wallet application, the wallet application may initiate one or more authentication processes as depicted at 410. In some embodiments, the wallet application may initiate an authentication process typically employed by that wallet application to initiate payments. In some embodiments, this may involve the use of biometric information (such as a fingerprint), providing login information associated with an account maintained by the wallet application, answering personal questions, etc.

Once the user has been successfully authenticated by the wallet application, the user may be prompted to elect a payment option to be used to complete the transaction as depicted in 412. In some embodiments, this may include credit card information, bank account information, information related to a mobile device account, or any other suitable payment option. Once this payment option has been selected, the wallet application may provide a token or real credential to be used in the transaction. In this scenario, the account associated with the checkout element 402A may have a master PAN (e.g., a PAN associated with the server itself and the account). Upon being provided a token by the wallet application or the wallet provider server computer associated with the wallet application, the wallet provider server computer may generate transaction information that includes the master PAN as the account to be used for payment and the token associated with the selected wallet application within the payload of the transaction information. The generated transaction information may then be provided to the merchant during checkout such that an authorization request generated for the transaction is subsequently routed for authorization.

Upon completion of either of the processes, the user may be asked to confirm the transaction prior to its completion at 414. In some embodiments, the user may be provided with a list of items to be purchased, applicable taxes, shipping information, and any fees associated with the transaction. Upon receiving an indication that the order is correct, the user may be presented with a transaction confirmation page 416.

Figure 5:
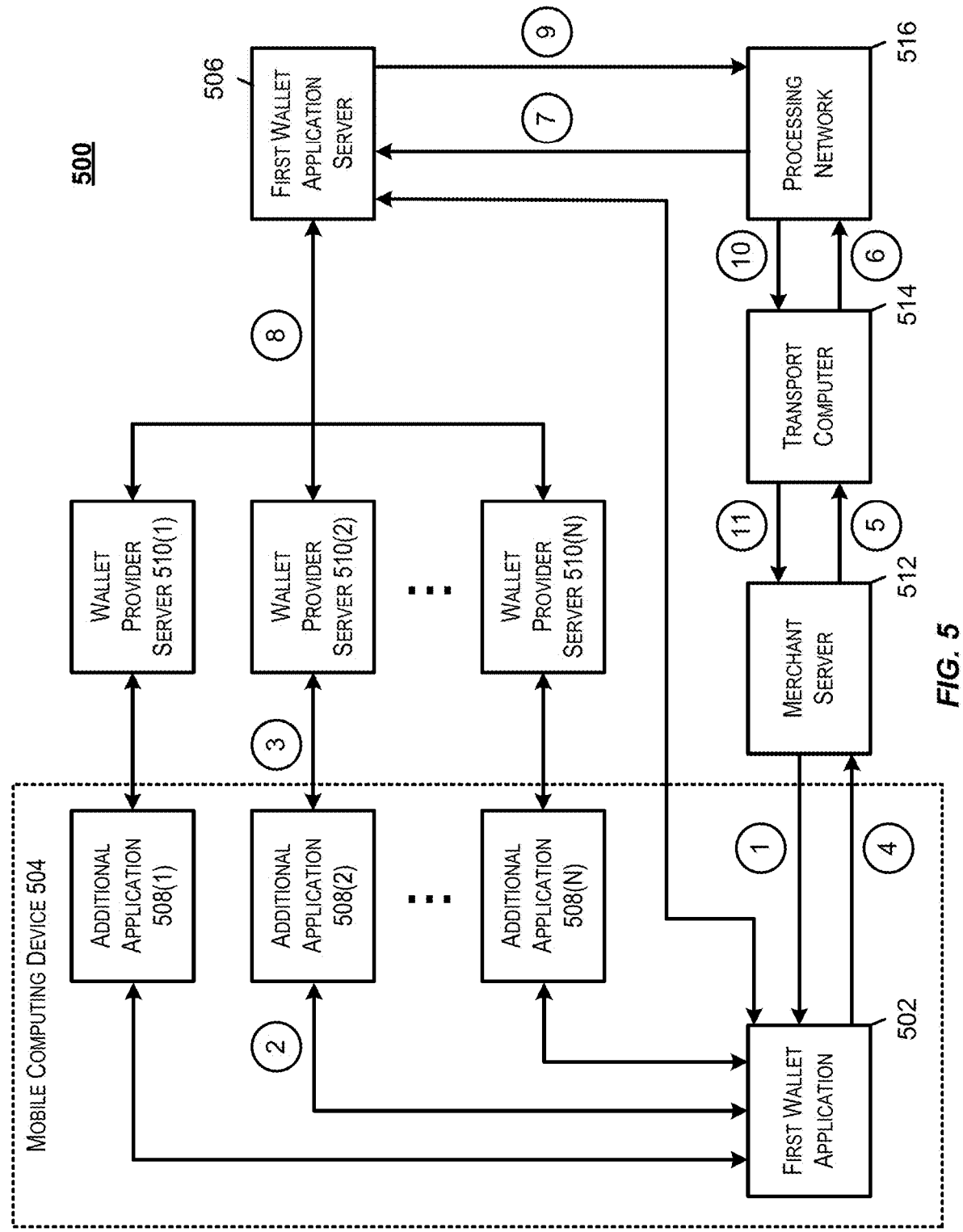
FIG. 5 depicts a process flow that may be implemented to enable completion of transactions using information associated with multiple wallet applications.

FIG. 5 depicts a process flow that may be implemented to enable completion of transactions using information associated with multiple wallet applications in accordance with embodiments of the disclosure. In FIG. 5, a first wallet application 502 installed on, and executed from, a mobile computing device 504 may be in communication with a remote wallet provider server computer 506 that provides support for the first wallet application 502.

In some embodiments, the first wallet application 502 installed on the mobile computing device 504 may identify a number of additional wallet applications (e.g., second, third, fourth wallet applications) available to a user of the mobile computing device 504. For example, additional wallet applications 508 (1-N) may be identified as being available to the user of a mobile computing device 504. In some embodiments, the first wallet application 502 may detect cookies installed on the mobile computing device by each of the additional wallet applications 508 (1-N). The cookies identified in relation to the additional wallet applications may include data for those additional wallet applications. For example, the cookie for an additional wallet application 508(1-N) may include a name, or other identifier, of the additional wallet application 508(1-N). The cookie may also include a graphic to be associated with the additional wallet application (e.g., a logo or icon image). In some embodiments, the additional wallet application 508(1-N) may be enrolled in a program implemented by the first wallet application 502. In some embodiments, the first wallet provider server computer 506 may maintain, in relation to a user account, a number of wallet application identifiers associated with the user. Each additional wallet application 508 (1-N) may be associated with a corresponding remote wallet provider server computer 510 (1-N) that maintains account information for that wallet account. In some embodiments, the first wallet provider server computer 506 and/or the first wallet application 502 may maintain login information for the various wallet applications 508(1-N) which may be used to access accounts maintained either locally (i.e., on the mobile computing device) or remotely (i.e., on the additional wallet provider server computers 510(1-N).

Additionally, the mobile computing device 504 may be configured to communicate with a merchant server 512 in order to receive and provide transaction information. The merchant server 512 may maintain information related to goods or services available for purchase (e.g., within an electronic catalog). In some embodiments, the merchant server 512 may be in communication with a transport computer 514 that maintains an account for the merchant server 512 as well as a processing network 516.

In the process flow 500, a merchant server 512 may provide information related to a transaction to a mobile computing device 504 at step 1. In some embodiments, the merchant server 512 may operate an electronic retailer which maintains an online presence. In at least some of these embodiments, the user may elect to initiate a transaction using the mobile computing device 504. In other embodiments, the user may initiate the transaction with the merchant server 512 via a different computing device. In these embodiments, the user may provide an indication that he or she wishes to complete the transaction using payment information stored on the mobile computing device 504. In some embodiments, the merchant server 512 may be in communication with a point-of-sale (POS) terminal located at a physical store location. In this example, the POS may provide transaction details to the mobile device 504 via a contactless card reader and the merchant server 512 may operate in parallel to the POS to complete a transaction.

Upon receiving the transaction information, the mobile device 504 may receive an indication from the user that the transaction is to be completed using the first wallet application 502 installed on the mobile computing device 504. Upon receiving this indication, an instance of the first wallet application 502 may be instantiated in memory of the mobile computing device 504. Once instantiated, a graphical user interface (GUI) associated with the first wallet application 502 may display options to use additional wallet applications 508 (1-N) to use to complete the transaction. In some embodiments, one or more wallet applications 508 (1-N) that are available to a user may not be available to complete the transaction. For example, a wallet application may not support payment to a merchant within (or outside of) a particular geographic region. In another example, a wallet application may not support a particular type of transaction. In some embodiments, a user may have a default wallet application indicated, so that transactions meeting predetermined criteria for activating the default wallet application automatically result in a selection of the default wallet application to complete that transaction.

Once an additional wallet application has been selected, an instance of the additional wallet application 508(2) may be instantiated at step 2 in order to complete the transaction. The wallet application 508(2), upon being instantiated, may authenticate the user of the mobile device 504 in accordance with processes implemented by that wallet application 508 (2). In this embodiment, the wallet application 508(2) may be characterized as an "authentication application," since it is used to authenticate the user of the mobile computing device 504. In some embodiments, this may require that the user provide login information or biometric information. Once the user has been authenticated, the additional wallet application 508(2) may cause the mobile device 504 to communicate details of the transaction to an additional remote wallet provider server computer 510(2) at step 3. In some embodiments, the additional wallet provider server computer 510(2) may pre-authorize the transaction based on the transaction details and/or data associated with the account maintained with respect to a user. For example, the wallet provider server computer 510(2) may have determined that the mobile computing device 504 has not been associated with any fraud or technical problems. In some embodiments, the wallet provider server computer 510(2) may respond to the transaction details by providing a token to be used to complete the transaction. In other embodiments, the additional wallet application 510(2) may generate a token to be used to complete the transaction on the mobile device 504.

Irrespective of which entity generates the token, the token may subsequently be provided to the first wallet application 502. Upon receiving the token to be used to complete the transaction, the first wallet application 502 may generate transaction information to be provided to the merchant server 512. In some embodiments, the transaction information may include a PAN associated with the user's account with the first wallet application 502. In some embodiments, the PAN may be associated with a payment device account type that is accepted by the merchant. For example, the first wallet application 502 may be associated with Visa, such that the PAN associated with the first wallet account is formatted as a Visa PAN. In this example, although the PAN may be formatted as a Visa PAN, there is no requirement that the user actually be associated with a Visa payment card. The transaction information may also include additional user information (e.g., a shipping address for the user) as well as the provided token information included in the payload to the merchant server 512.

At this point in the process flow, the process may split based on whether the first wallet application 502 is configured to perform a "push" transaction in which authorization for the transaction is initiated by the mobile computing device 504, or a "pull" transaction in which authorization for the transaction is initiated by the merchant server 512. FIG. 5 shows a pull transaction. One skilled in the art would understand that push transactions can also be used in embodiments of the invention.

At step 4, the first wallet application 502 may transmit the transaction information to the merchant server 512. The merchant server 512, upon receiving the transaction information, may generate an authorization request message with at least some of the transaction information and may forward it to the transport computer 514 at step 5. The authorization request message may then be provided to a processing network 516 at step 6. The processing network 516 may parse the provided PAN to identify an authorization entity to be used in completing the transaction. For example, the PAN may include a banking identification number (BIN) that indicates the authorization entity. In this case, since the PAN is associated with the first wallet application provider server computer 506, the processing network 516 would route the authorization request to it at step 7.

Once the first wallet provider server computer 506 receives the authorization request, it may identify an appropriate additional wallet provider server computer 510 to complete the transaction based on information provided in the payload of the authorization request (e.g., the token). The first wallet provider server computer 506 may communicate with the additional wallet provider server computer 510(2) at step 8. Once the additional wallet provider server computer 510(2) receives the information provided in the payload, the additional wallet server computer 510(2) may initiate an authorization process with a transport computer, a processing network, and an authorizing computer as described above.

In some embodiments, the first wallet provider server computer 506 may generate a second authorization request message using the information provided in the payload of the received authorization request. For example, in the scenario in which the user selects a credit card payment device instead of a wallet application, the payload information may include a second PAN. In this scenario, the first wallet application 502 might generate a second authorization request using the second PAN and submit that second authorization request to processing network 516 or a different processing network associated with the second PAN. In this scenario, the first wallet provider server computer 506 may await an authorization response to the second authorization request.

Once the first wallet provider server computer 506 has confirmed that the transaction will was successfully processed by the additional wallet provider server computer 510(2), the first wallet provider server computer 506 may, at step 9, provide an authorization response message. The authorization response message may include an indication of whether the transaction is to be approved or declined. This authorization response message may be routed to the transport computer at step 10 and subsequently relayed to the merchant server 512 at step 11. Upon receiving this authorization response, the merchant server 512 may approve or decline the transaction.

A clearing and settlement process may be performed at a later time.

It should be noted that, during the process depicted by process flow 500, there is no requirement that the additional wallet application 508(2) be provided information related to the merchant server 512. Furthermore, there is no requirement that the merchant server 512 be informed of the identity of the wallet application 510(2) from which the payment is ultimately being collected for the transaction. In some embodiments, the first wallet application 502 may behave as the merchant for the purposes of communicating with the additional wallet application 508(2) and may behave like a payment device to the merchant server 512 as the payment device.

Figure 6:
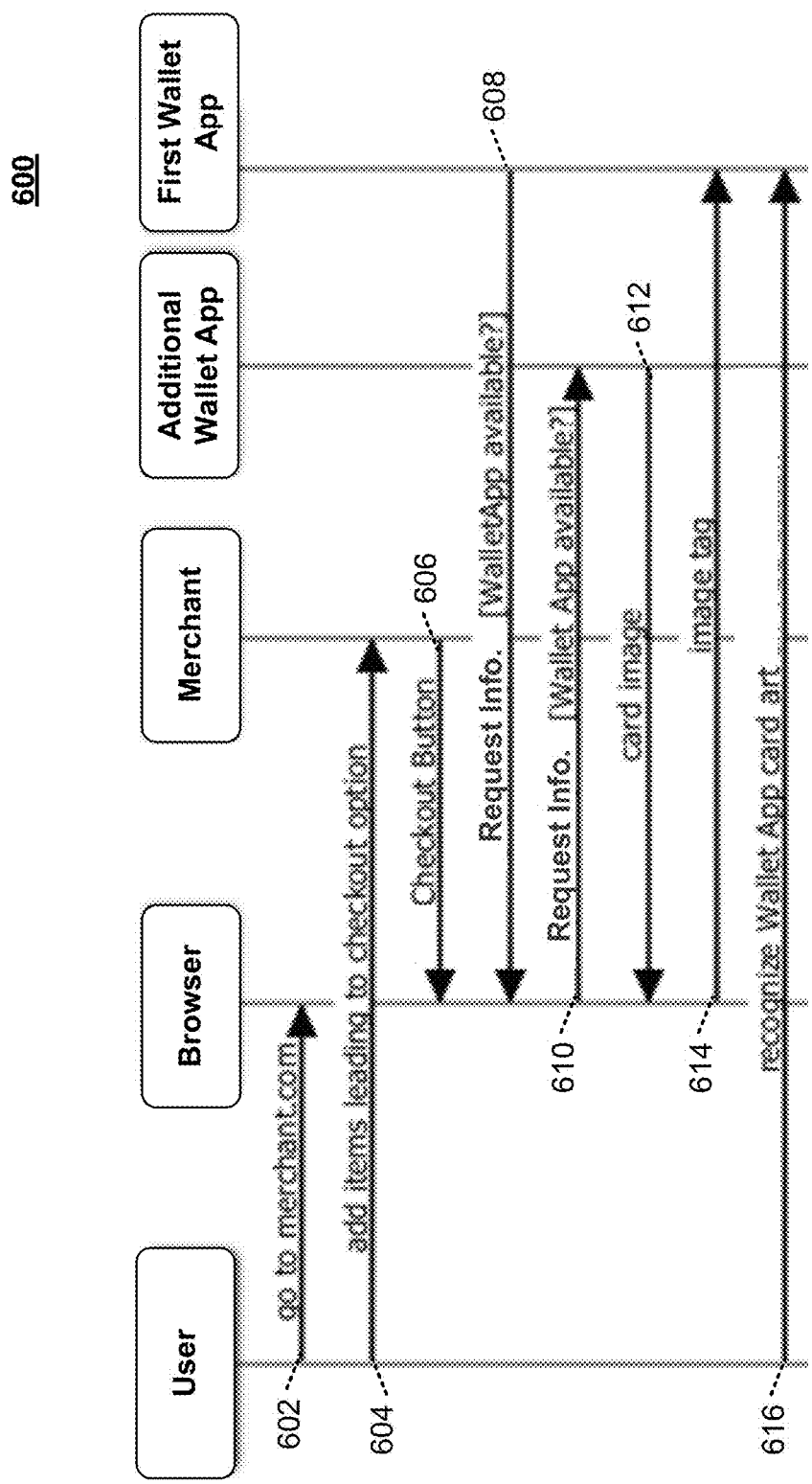
FIG. 6 shows a flow diagram for providing a checkout button to the user.

FIG. 6 shows a flow diagram for providing a checkout button to the user. In this example, "WalletApp" may be a first wallet provider server computer, and "Merchant" may be affiliated with a merchant server computer. Depicted in FIG. 6 is a process 600 in which a checkout option is generated for a first wallet application in accordance with embodiments of the disclosure.

Process 600 may begin at 602, when a user visits a merchant and indicates an intent to perform a checkout operation using his or her computing device (e.g., mobile phone). For example, the user may visit a website operated by an online merchant, or the user may visit a physical retail location and receive information related to a transaction to be completed (e.g., via a contactless reader). At 604, the user may select a number of items to be included in the transaction, which may occur before or after 602.

At 606, the merchant may present a checkout mechanism (such as a checkout button) associated with a first wallet application to the user. For example, the merchant may have a checkout button included on a virtual shopping cart checkout page that directs the user to an instance of the first wallet application within a browser application. In another example, the user may elect to initiate a first wallet application on his or her computing device.

Once the first wallet application has been initiated, the instantiated instance of the first wallet application may determine which, if any, additional wallet applications are available to complete the current transaction at 608. In some embodiments, the additional wallet applications may be identified as being available based on terms and conditions associated with their use (e.g., types of transactions that may be conducted, locations at which transactions may be conducted, etc.). In some embodiments, the first wallet provider server computer may maintain a list of additional wallet applications associated with a particular user. Upon determining that a transaction is to be conducted, the first wallet application may receive details of the transaction from the computing device and may filter any wallet applications associated with the user based on those transaction details. The list of remaining additional wallet applications may then be provided to the first wallet application instance implemented on the computing device.

At 610, the instance of the first wallet application may check for local availability of each of the identified additional wallet applications. For example, the first wallet application may check to ensure that each of the additional wallet applications is installed on the computing device and is available for checkout. In some embodiments, the first wallet application may do that by checking for cookies associated with those additional wallet applications. The first wallet application may also obtain various data related to the first wallet application. For example, at 612, the first wallet application may retrieve image data (e.g., a card image) to be associated with the additional wallet applications.

At 614, images associated with each of the additional wallet applications identified may be presented as potential checkout options to the user. For example, for each additional wallet application that may be used to complete the transaction, an icon or thumbnail image may be present which represents the additional wallet application. These images may be retrieved from the additional wallet applications themselves, they may be stored in an image repository by the first wallet provider server computer, or they may be obtained from a cookie associated with the additional wallet application. Upon presenting these images, the user may recognize the wallet applications associated with the images and provide a selection of one of them at 616.

Figure 7:
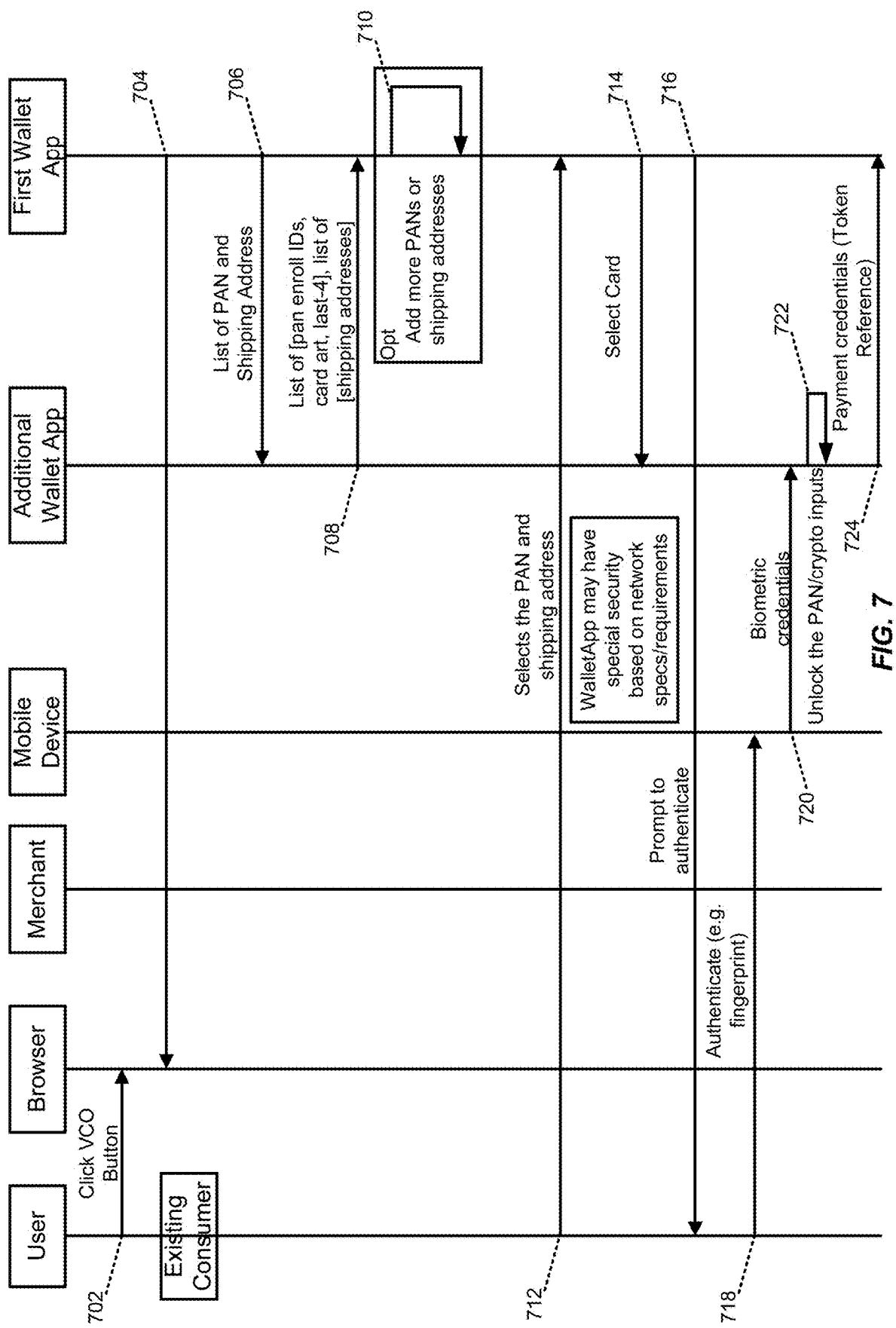
FIG. 7 shows a flow diagram illustrating a process for enabling selection of a card and executing an authentication of a user in a wallet-specific manner.

FIG. 7 shows a flow diagram illustrating a process for enabling selection of a card and executing an authentication of a user in a wallet-specific manner. In process 700, a user may be asked to select a payment option made available via a first wallet application. It should be noted that the selected payment option may be made available to complete a transaction even if it the use of that payment option is not typically supported by the merchant. In some embodiments, the first wallet application may have agreements in place with the merchant and/or the additional wallet applications. It should also be noted that even if the first wallet application is supported by a first transaction processing network, payment options supported by the first wallet application may be affiliated with a different transaction processing network than the one that supports the first wallet application. For example, if the first wallet application is affiliated with a Visa™ transaction processing network (e.g., VisaNet™), it may still present credit card payment devices associated with Mastercard™ or American Express™.

Process 700 may begin at 702, when a user selects a checkout mechanism associated with a first wallet application within a browser. In some embodiments, the checkout mechanism may be presented as a payment option by a merchant. For example, the checkout mechanism may be a VCO button. In this example, VCO stands for Visa Checkout™, which is a particular embodiment of a first wallet application, which may be a multi-wallet application. If the user is an existing consumer with the first wallet application, then he or she may be required to login to an account. The first wallet provider server computer may then communicate a list of payment devices associated with that user's account to the browser at 704. If the user is not an existing consumer of the first wallet application, then the user may elect to open an account with (e.g., enroll in) the first wallet application.

The list of payment options provided to the user may include both token services (e.g., wallet applications) and credit cards with which the user is associated. For each payment option associated with the user, the first wallet application may maintain account information, such as a token, PAN, shipping address, or any other suitable consumer-related information. When an instance of an additional wallet application is instantiated by the first wallet application, at least some fields may be pre-populated by the first wallet application.

In some embodiments, for each identified payment option associated with an account, the first wallet application may communicate consumer information (e.g., account numbers and shipping information) to the additional wallet application at 706. In some embodiments, the wallet application may respond with a number of account-related details (e.g., a list of enrolled accounts, images to be associated with the wallet application, verification details, shipping addresses, or any other suitable account information) at 708. Based on this received information, the first wallet application may update its user records at 710 (e.g., by adding, removing, or otherwise updating details).

Once a user has selected a payment option from the list of payment options at 712, the first wallet application may initiate a payment process to complete the current transaction using the selection. If the payment option selected is a credit card or other account associated with a PAN, then the first wallet application may generate or initiate the generation of an authorization request to be submitted to a processing network and routed to an authorization entity affiliated with the credit card (e.g., an issuer). If the selected payment option is an additional wallet application, then the first wallet application may instantiate an instance of, or otherwise execute, the additional wallet application at 714 in order to enable it to authenticate the user prior to completing the transaction.

The additional wallet application may then initiate any special security and/or authentication requirements that are typically employed by the additional wallet application when verifying a user's identity. In some embodiments, the security requirements may be conveyed to the first wallet application, which may initiate a user authentication process in accordance with those requirements. In some embodiments, the first wallet application may initiate a user authentication process. To initiate the authentication process, the user may be provided an authentication prompt at 716.

At 718, the user may respond to the prompt by following authentication instructions provided within the prompt. In some embodiments, this may involve providing information such as a fingerprint, voice print, retinal scan, or other biometric identifiers to the mobile device. The mobile computing device may forward any received biometric credentials to the additional wallet provider server computer at 720. Upon receiving those biometric credentials, the additional wallet provider server computer may compare that biometric information to biometric information stored in relation to the user in order to authenticate the user.

Once the additional wallet provider server computer has authenticated the user, the wallet application may unlock PAN/crypto inputs. In some embodiments, the biometric credentials may be used to unlock (e.g., decrypt) a PAN or to generate a cryptogram at 722. In this way, the biometric credentials may be used as a biometric key to access payment information associated with the account. The additional wallet application may, upon unlocking payment information, provide the payment information or a derivative of that payment information to the first wallet application at 724. For example, the additional wallet application may provide a token generated from the payment information to the first wallet application to be used to complete the transaction.

Figure 8:
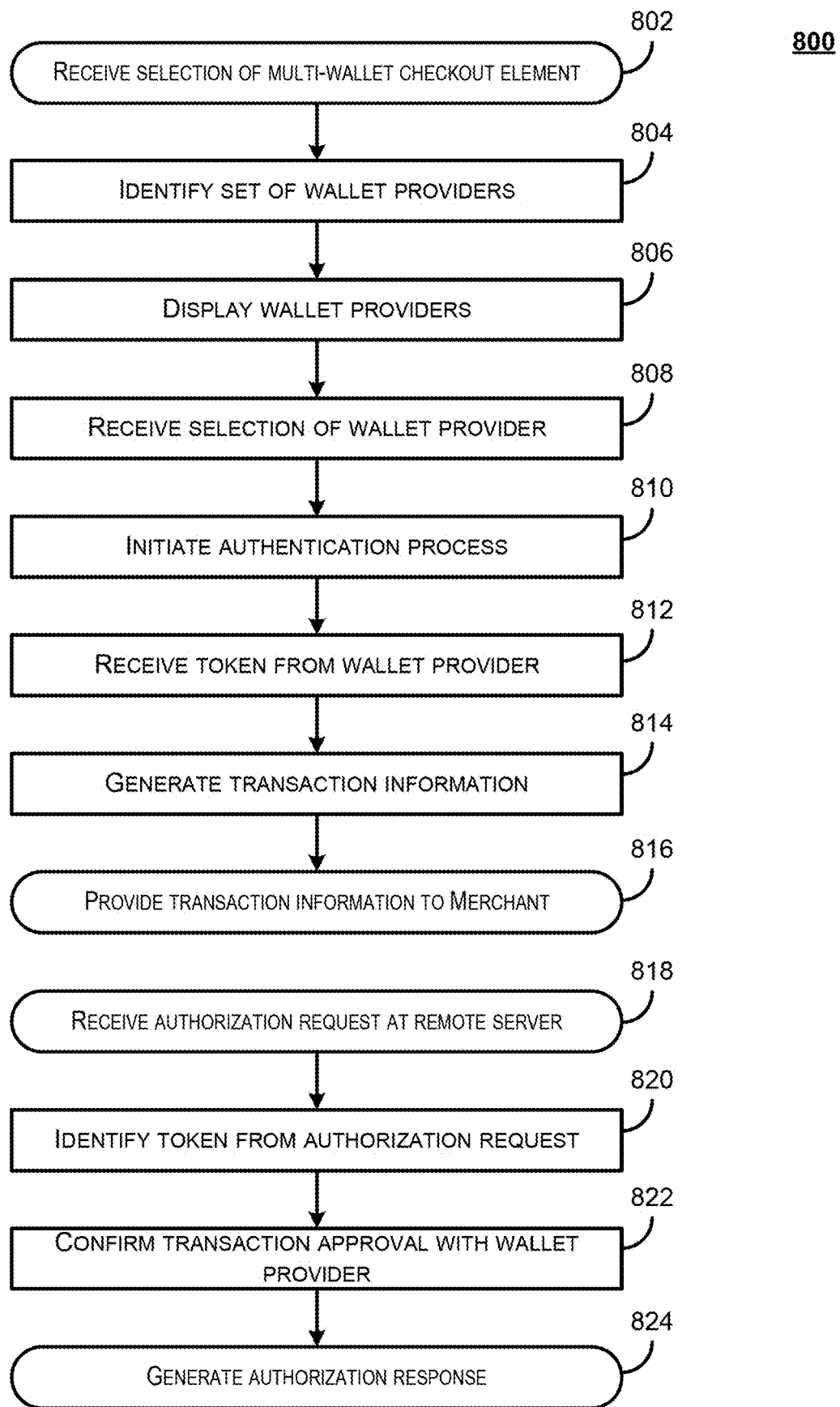
FIG. 8 depicts a flow diagram illustrating a process for completing a transaction using a wallet application.

FIG. 8 depicts a flow diagram illustrating a process for completing a transaction using a first wallet application in accordance with embodiments of the disclosure. In FIG. 8, process 800 may be performed at least partially on a mobile computing device operated by a user (e.g., steps 802-816) and at least partially on a remote server associated with a first wallet application (e.g., steps 818-824).

Process 800 may begin at 802, when a computing device receives an indication that a user has selected a first wallet checkout element. In some embodiments, the first wallet checkout element may be presented to the user within a merchant's checkout page on a website. In some embodiments, the user may select a first wallet application installed on the user's computing device. Once instantiated, the first wallet application may be used to select a payment method to be used in completing a transaction. In some embodiments, the steps described in process 800 may be performed prior to presenting the computing device to a contactless reader at a merchant POS to complete a transaction.

Upon receiving this indication, the computing device may identify an account associated with the user. For example, the user may be required to log into an account maintained with respect to the first wallet checkout element. Once an account has been identified for the user, a number of additional wallet providers (and other payment options) may be identified with respect to the user account at 804. In some embodiments, credit card numbers or bank account numbers may also be identified with respect to the user account.

In some embodiments, the set of identified additional wallet providers may be filtered according to requirements and/or configuration settings associated with those wallet providers. For example, an additional wallet provider may place restrictions on the types of transactions that may be carried out using that additional wallet provider. In another example, the additional wallet provider may place restrictions on a geographic region within, or outside of, which the wallet provider may be used to complete a transaction or items purchased in a transaction may be shipped to. The identified set of additional wallet providers may be filtered based on these criteria and only those wallet providers appropriate for the current transaction may be displayed on the computing device at 806.

At 808, the computing device may receive a selection of an additional wallet provider to be used in the transaction. The selection of the additional wallet provider may be received as input from a touchscreen display of the computing device. For example, the user of the computing device may touch the additional wallet provider in the displayed list of additional wallet providers which he or she would like to use to complete the transaction.

At 810, the computing device may initiate an authentication process in accordance with the selected additional wallet provider. For example, the first checkout application may initiate execution of an additional wallet provider and relinquish control of the computing device to that additional wallet provider. The additional wallet provider may then collect authentication information from the user to authenticate that user. It should be noted that the authentication process that may be initiated by the additional wallet provider can be different from any authentication process noted above with respect to the first wallet application (e.g., requiring the user to log in). In some embodiments, the first wallet application may be provided with a set of authentication requirements by the additional wallet provider and may perform the authentication process on behalf of the additional wallet provider using those authentication requirements.

At 812, the computing device may receive a token from the additional wallet provider upon successful completion of the authentication process. In some embodiments, the token may be a transaction-specific token or another suitable type of limited-use token. In some embodiments, the token may be valid for a limited amount of time. The token may be relayed to an application and/or a remote server associated with the checkout element.

At 814, transaction information may be generated that includes a PAN associated with the checkout element and the received token. In some embodiments, the transaction information may be generated by another application installed on the computing device associated with the first wallet checkout element. In some embodiments, the transaction information may be generated by a remote first wallet provider server computer associated with the checkout element. The transaction information may be generated to include a PAN associated with the checkout element for routing purposes within a transaction processing network.

At 816, the generated transaction information may be provided to the merchant to complete the transaction. The merchant, upon receiving the transaction information, may generate an authorization request or may forward the transaction information to an acquirer computer to have it generate an authorization request. The authorization request may then be submitted to a transaction processing network. The merchant may subsequently receive an authorization response from the transaction processing network that indicates approval of the transaction.

As described above, process 800 may be performed at least partially on a mobile computing device operated by a user and at least partially on a remote server associated with a first wallet application. The steps described above (steps 802-816) are to be performed by a computing device, whereas the following steps (818-824) are to be performed by a first wallet provider server.

At 818, a remote first wallet provider server computer associated with the first wallet application may receive the authorization request. Upon receiving the authorization request, the remote first wallet provider server computer may identify the token associated with the additional wallet provider at 820. The remote server may then identify the additional wallet provider associated with the transaction from the token. In some embodiments, the first wallet provider server computer may receive transaction information from the computing device, which may be used to identify the additional wallet provider. Once the additional wallet provider has been identified, the first wallet provider server computer may confirm with the additional wallet provider that the transaction is approved at 822. In some embodiments, this may involve generating a second authorization request to be transmitted to an additional wallet provider server computer associated with the additional wallet provider. Upon confirming the status of the transaction, the first wallet provider server may generate an authorization response message and may transmit it to the merchant server via the transaction processing network at 824.

Figure 9:
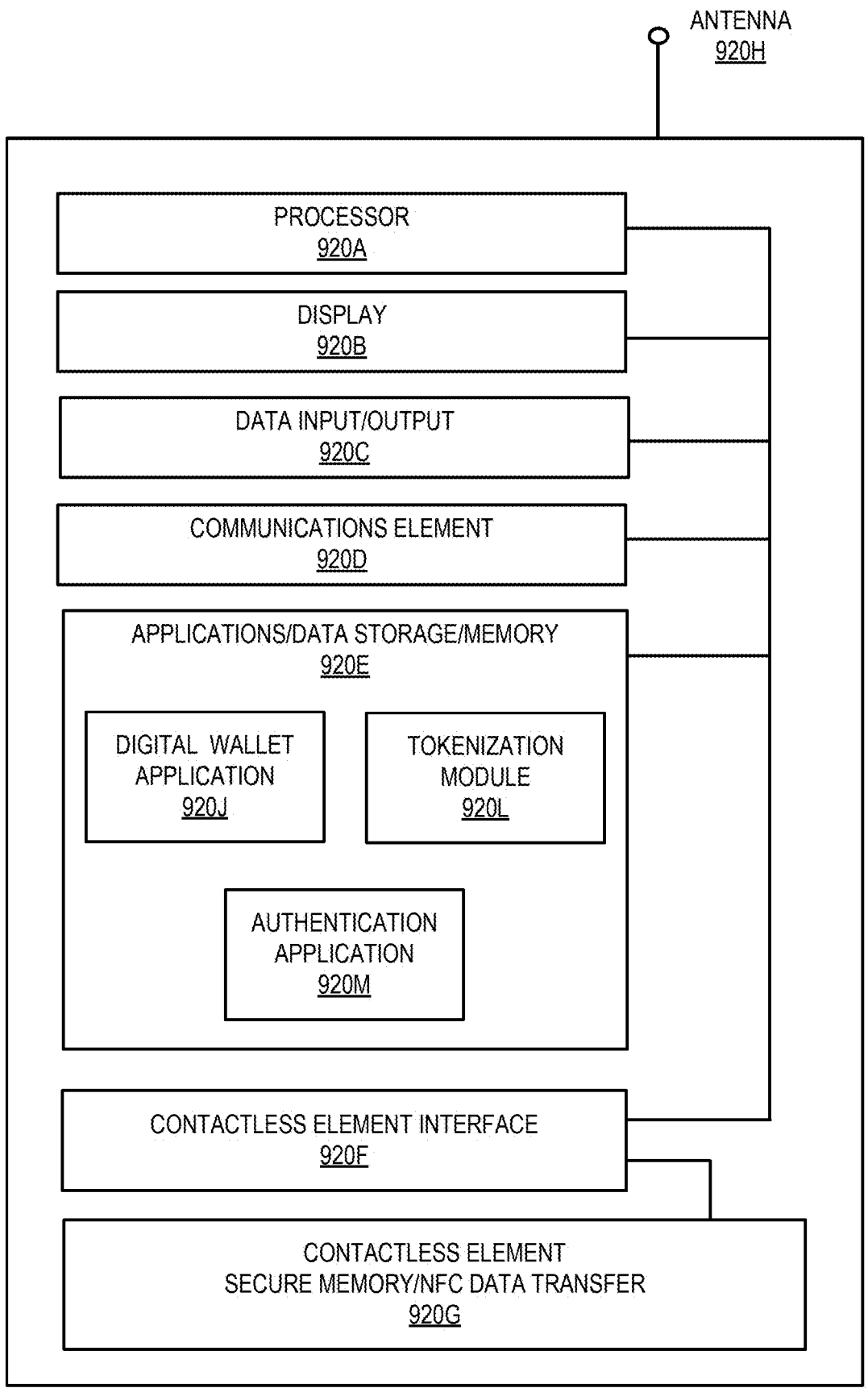
FIG. 9 shows an example of the mobile device, according to some embodiments of the invention.

FIG. 9 shows an example of the mobile device 920, according to some embodiments of the invention. Mobile device 920 may include circuitry that is used to enable certain device functions, such as telephony. The functional elements responsible for enabling those functions may include a processor 920A that can execute instructions that implement the functions and operations of the device. Processor 920A may access memory 920E (or another suitable data storage region or element) to retrieve instructions or data used in executing the instructions, such as provisioning scripts and mobile applications. Data input/output elements 920C, such as a keyboard or touchscreen, may be used to enable a user to operate the mobile device 920 and input data (e.g., user authentication data). Data input/output elements 920C may also include biometric sensors. Data input/output elements may also be configured to output data (via a speaker, for example). Display 920B may also be used to output data to a user. Communications element 920D may be used to enable data transfer between mobile device 920 and a wired or wireless network (via antenna 920H, for example) to assist in connectivity to the Internet or other network, and enabling data transfer functions. Mobile device 920 may also include contactless element interface 920F to enable data transfer between contactless element 920G and other elements of the device, where contactless element 920G may include a secure memory and a near field communications data transfer element (or another form of short range communications technology). As noted, a cellular phone or similar device is an example of a mobile device 920 that may be used in accordance with embodiments of the present invention. However, other forms or types of devices may be used without departing from the underlying concepts of the invention. For example, the mobile computing device 920 may be in the form of a payment card, a key fob, a tablet computer, vehicle, a wearable device, etc.

The memory 920E may comprise a digital wallet application 920J, a tokenization module 920L, an authentication application 920M, and any other suitable module or data. The mobile device 920 may have any number of mobile applications installed or stored on the memory 920E and is not limited to that shown in FIG. 9.

The digital wallet application 920J may provide a user interface for the user 910 to provide input and initiate, facilitate, and manage transactions using the mobile device 920. The digital wallet application 920J may be able to store and/or access a payment token and/or payment credentials. The digital wallet application 920J may also store an issuer-specific key, or any other suitable encryption means. The digital wallet application 920J may be able to cause the mobile device 920 to transmit the payment token and/or payment credentials in any suitable manner (e.g., NFC, QR code, etc.). In some embodiments, in order to increase security, payment tokens and/or payment credentials may not be stored at the mobile device 920. Instead, the payment tokens and/or payment credentials can be temporarily retrieved from a remote computer when a transaction is being performed.

Payment Illustration

Figure 10A:
FIG. 10A illustrates a first example of an authentication application logo that may be obtained and dynamically embedded in a checkout element.
Figure 10B:
FIG. 10B illustrates a second example of an authentication application logo that may be obtained and dynamically embedded in a checkout element.
Figure 10C:
FIG. 10C illustrates a third example of an authentication application logo that may be obtained and dynamically embedded in a checkout element.

In order to assist a user in acknowledging an authentication application selected to be used as the wallet service in the wallet provider, an indication of the authentication application may be displayed on the wallet provider. FIGS. 10A-10C may be illustrations of the indication of the authentication application being displayed on the wallet provider. The user then may proceed with confidence by viewing that the desired authentication application has been selected or the user may back out of a transaction if the incorrected authentication application has been selected.

The authentication application selected may be determined in a variety of ways and algorithms may be used to assist in the process of determining the appropriate authentication application. In one embodiment, there may be only one authentication application that has been added to the wallet provider. Logically, the only authentication application available may be the one that is displayed.

In another embodiment, the wallet application may have a variety of storage locations to poll to determine which authentication applications are available for selection. For example, if the wallet provider is using a browser, browser data (e.g., cookies) may be reviewed for known authentication applications. The browser data also may indicate a location of a symbol to be displayed to represent the selected authentication application. In some embodiments, the symbol may be stored in a cache in the browser. In another embodiment, the symbol may be stored remotely and may be accessed using an address provided by the browser data. In another embodiment, the wallet provider may query the selected authentication application (e.g., send a request to a remote server that supports the authentication application) for image data and the image data may be returned to the wallet provider. In yet another embodiment, the image data may be included in the wallet provider or in a wallet provider update such that the image may be stored locally.

In another embodiment, if the wallet provider is an application, such as an application on a mobile computing device, the application may undertake similar steps as previously described. More specifically, the application may review application data for known authentication applications such as reviewing a registry for a match to known authentication applications on a list of authentication applications. The application data also may indicate a location of a symbol to be displayed to represent the selected authentication application. In some embodiments, the symbol may be stored in a cache in the application. In another embodiment, the symbol may be stored remotely and may be accessed using an address provided by the application data. In another embodiment, the wallet provider may query the selected authentication application for image data and the image data may be returned to the wallet provider. In yet another embodiment, the image data may be included in the wallet provider or in a wallet provider update such that the image may be stored locally. Further, the wallet provider may query the mobile computing device for other authentication applications that are registered on the mobile computing device. In some embodiments, when there are multiple authentication applications, the wallet provider may display default values which may be preset or may be set by the user.

In embodiments where the user may be unknown at the time of button rendering, data may be available by integrated checkout authentication applications to the wallet application button via some JavaScript API. An adaptor object may be available from the authentication applications and may be loaded by the wallet authentication application. The adaptor interface object may be called to begin a transaction with an authentication application and to initialize the adaptor interface.

Common additional objects may include payment parameter objects, merchant information objects, checkout payment information objects, wallet information objects, card art objects, user information objects, checkout response objects. The card art objects may include the art to be displayed to the user to represent the authentication application selected. Logically, each of the above objects may include parameters such as the card art object which includes details about the art to be displayed to indicate the authentication application desired.

When there are multiple authentication applications available to a user, determining the authentication application to be displayed may also follow an algorithm. In one embodiment, a default value may be set by the wallet application. In another embodiment, a user may set a preferred authentication application, to which selection may be defaulted. Further, the algorithm may use one or more machine learning algorithms. As an example, a user may use a certain authentication application for purchases at a given merchant. As another example, a different authentication application may be used for payments over a given amount such as $5,000. In yet another embodiment, the algorithm may learn that certain categories of purchases may use one authentication application and other categories may use another authentication application. More specifically, business purchases may use one authentication application and personal purchases may use a different authentication application. The algorithm may learn the preferences of a user by reviewing user actions over time or allowing the user to set the preferences in advance using a graphical user interface where the user may set conditions and responses to those conditions such as using a specific authentication application for gasoline purchases.

Determining a location in which card art objects may be stored may follow an algorithm which may be implemented by a processor physically configured to execute the algorithm. In one embodiment, the algorithm may determine if there is a past location used for card art for the selected authentication application. If there is a past location that was successfully used, that location may be queried for card art. For example, if the card art was last successfully located in a local memory for a given authentication application, the local memory may be queried for the appropriate card art. As mentioned previously, the local card art may have been installed when the authentication application was installed or updated. Similarly, the local card art may have been installed when the wallet authentication application was installed or updated. For example, there may be a limited number of authentication applications which may be compatible with the wallet authentication application and the card art for those compatible applications may be included with the wallet authentication application installation.

If there is no card art stored locally, the algorithm may direct the processor to request the card art object from either the authentication application or the wallet authentication application. As both authentication applications (wallet and remote) may be in communication with one or more remote computing devices, the remote computing devices may have the desired card art. In some embodiments, the algorithm may use an API to request a card art object from the authentication application and the authentication application may respond with an object that includes the card art as one of the elements. If the authentication application does not respond with the desired card art, the algorithm may use an API to request a card object from the wallet authentication application. If the wallet authentication application does not respond with the desired card art, the algorithm may display text which indicates the authentication application that is currently selected to be used.

Each of FIGS. 10A-C illustrate examples of authentication application selection icons or images with the additional symbols or names of the authentication application service displayed. FIG. 10A illustrates a first example of an authentication application logo that may be obtained and dynamically embedded in a checkout element. FIG. 10B illustrates a second example of an authentication application logo that may be obtained and dynamically embedded in a checkout element. FIG. 10C illustrates a third example of an authentication application logo that may be obtained and dynamically embedded in a checkout element.

In FIGS. 10A-C, the user may be presented a checkout element 1002 within a merchant checkout page. The checkout element 1002 may be embedded as a link within the merchant checkout page, so that the merchant retrieves one or more images associated with the checkout element when the merchant checkout page is generated. Various elements of the checkout element may be rendered in a dynamic manner. For example, card art 1004 associated with a payment account of the user may be retrieved and displayed when the merchant checkout page is generated.

In some embodiments, a remote server associated with the checkout element may receive a request (upon generation of a merchant checkout page) to provide a checkout element. The request may include browser information that indicates a user's identity. For example, a helper feature of the browser application being used may provide an email address for the user in the request. Upon receiving the request, the remote server may identify one or more accounts associated with the user and may render images associated with those accounts. Additionally, the request may include information obtained locally on the computing device. For example, the request may include images obtained from cookies installed on the computing device.

The remote server may render images obtained locally within the checkout element. In some embodiments, the checkout element may be generated using a combination of locally obtained imagery and account imagery.

In some embodiments, the checkout element may be generated locally on the computing device. For example, the checkout element may include a frame or template having some portions to be dynamically updated. In this example, images for a number of authentication applications may be obtained from cookies installed on the computing device and may be automatically rendered within the portion of the checkout element to be dynamically updated.

In some embodiments, the card art may represent an image of a physical payment device associated with the user. Additionally, the names and images of various authentication applications 1006, 1008, and 1010 may be displayed below the checkout element such that a user will understand the authentication application may be used to authenticate transactions when the checkout element is selected. The icons/images may be obtain in any of the manners described previously. In some embodiments, the information presentation surrounding the authentication application image may include a template or other preconfigured format into which the image for the authentication application may be embedded. In some embodiments, the information presentation surrounding the authentication application image may be provided by the authentication application itself or may be customized in accordance with specifications associated with the authentication application.

Figures 11A, 11B, 11C:
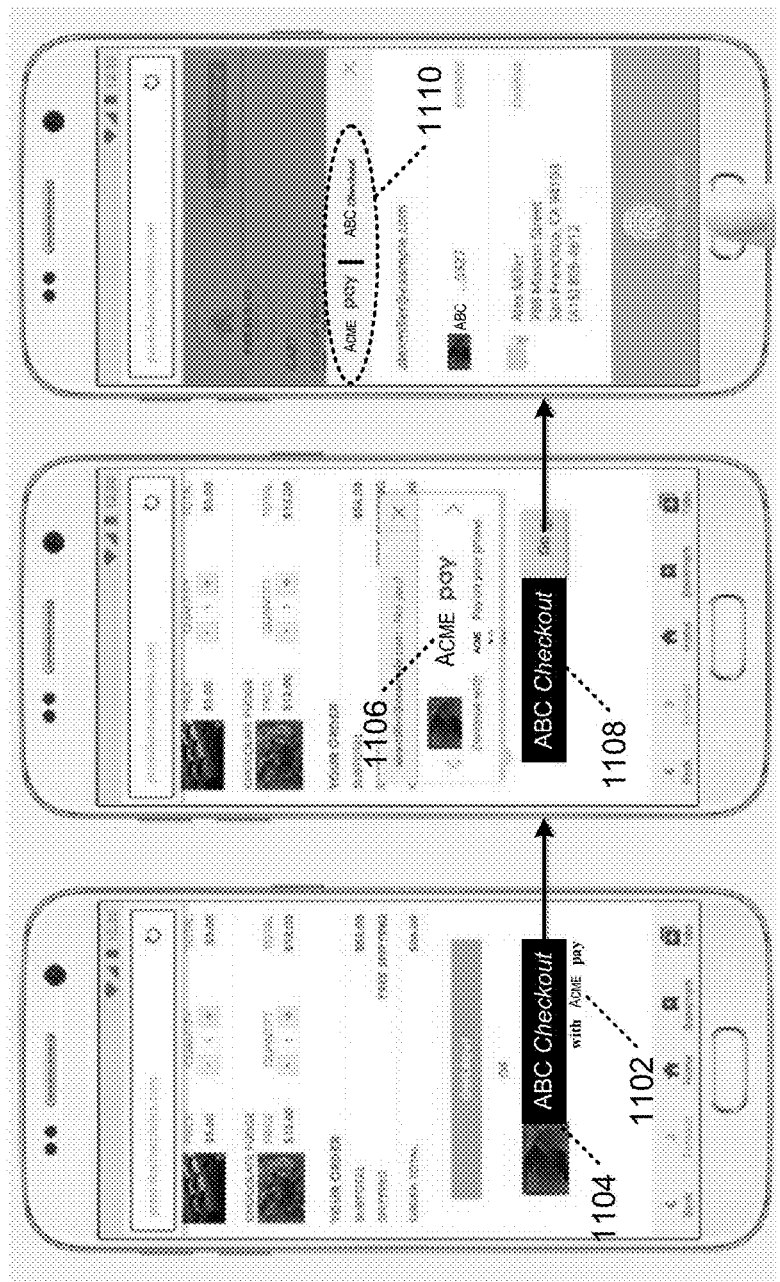
FIG. 11A illustrates an example in which imagery for an authentication application has been dynamically rendered within a checkout element.
FIG. 11B illustrates an example in which imagery is dynamically rendered in a popup notification to ensure awareness by the user.
FIG. 11C illustrates an example in which an instance of an authentication application has been initiated in order to authenticate a user.

FIGS. 11A-11C may be illustrations of the use of the images or icons of the authentication application service being used as part of a transaction. FIG. 11A illustrates an example in which imagery for an authentication application has been dynamically rendered within a checkout element. In FIG. 11A, an image 1102 associated with ACME Pay has been added to a checkout element 1104 associated with ABC Checkout. The checkout element 1104 may be selected to pay for a transaction and the user would then be aware that ACME Pay would be used to authenticate that transaction.

FIG. 11B illustrates an example in which imagery is dynamically rendered in a popup notification to ensure awareness by the user. In FIG. 11B, a popup notification 1106 identifying the authentication application for ACME Pay may be presented upon selection of the checkout element 1108. In this illustrated example, upon selection of the checkout element 1108, the user may continue the process using the ACME Pay application. For example, selection of the ACME Pay application within the notification 1106 may cause an instance of an ACME Pay application to execute on the user's mobile device and authenticate the user.

FIG. 11C illustrates an example in which an instance of an authentication application has been initiated in order to authenticate a user. In FIG. 11C, the transaction continues with ACME Pay and a user submits a fingerprint to the ACME Pay system to verify that a transaction should proceed. In some embodiments, information from the checkout element may be passed to the authentication application for display at 1110.

Figure 12:
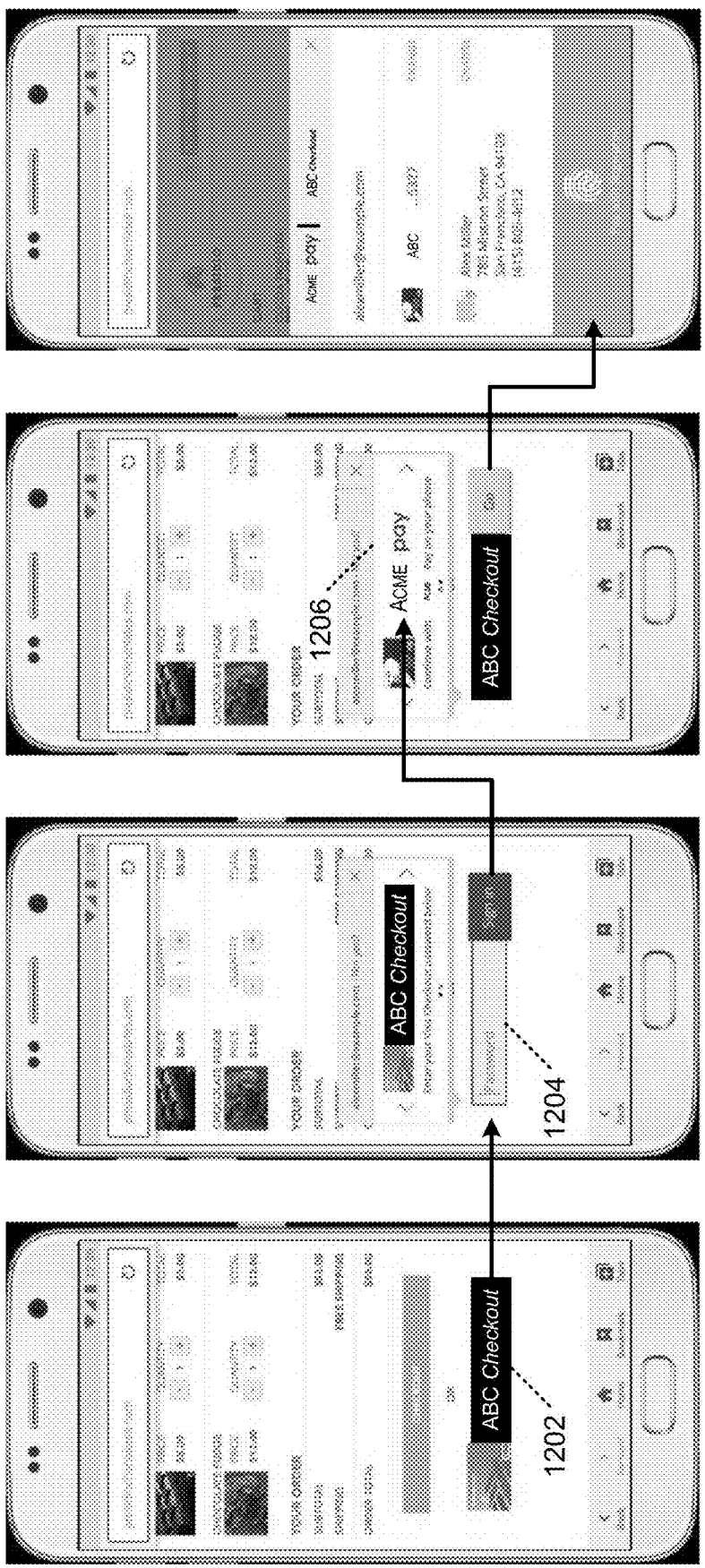
FIG. 12 depicts a process for initiating a payment using a checkout element in accordance with at least some embodiments.

FIG. 12 depicts a process for initiating a payment using a checkout element in accordance with at least some embodiments. In FIG. 12, a user may be associated with an ABC Checkout account, which may be thought of as a wallet provider application. The user may begin a checkout procedure using the wallet provider application by selecting the checkout element 1202 and entering a password (and a login if the user cannot be identified) via an input field 1204. Once verified, various authentication applications may be presented to the user via a notification 1206, one of which may be the Acme authentication application as illustrated. The user may select to use the Acme authentication application as the payment account inside the wallet provider application, and the Acme authentication application may render a display to accept an authorization input in the form of a fingerprint. Once fingerprint information (or any other suitable identification information) is obtained and confirmed, the payment may proceed.

Figure 13:
FIG. 13 depicts a process for initiating a payment using a checkout element in which user identifier information is stored locally in accordance with at least some embodiments.

FIG. 13 depicts a process for initiating a payment using a checkout element in which user identifier information is stored locally in accordance with at least some embodiments. As mentioned previously, the wallet provider application may recall preferences for payment devices and/or authentication applications to be used as part of the wallet provider application. In FIG. 13, the checkout element 1302 associated with the wallet application may be dynamically rendered to include imagery associated with a default authentication application.

In some embodiments, the wallet provider application may store an indication of a default authentication application or the last authentication application used to authenticate a transaction. This authentication application, illustrated as Acme pay, may automatically be presented as the authentication application to be used in the current transaction. If the user prefers, another payment device or authentication application may be selected. However, if the default authentication application (Acme Pay) is acceptable, the system may simply progress to use Acme Pay as illustrated. In embodiments of FIG. 13, image information for ACME Pay, the authentication application, may be retrieved in any of the manners previously discussed and may be dynamically rendered upon generation of the checkout element 1302.

Figure 14:
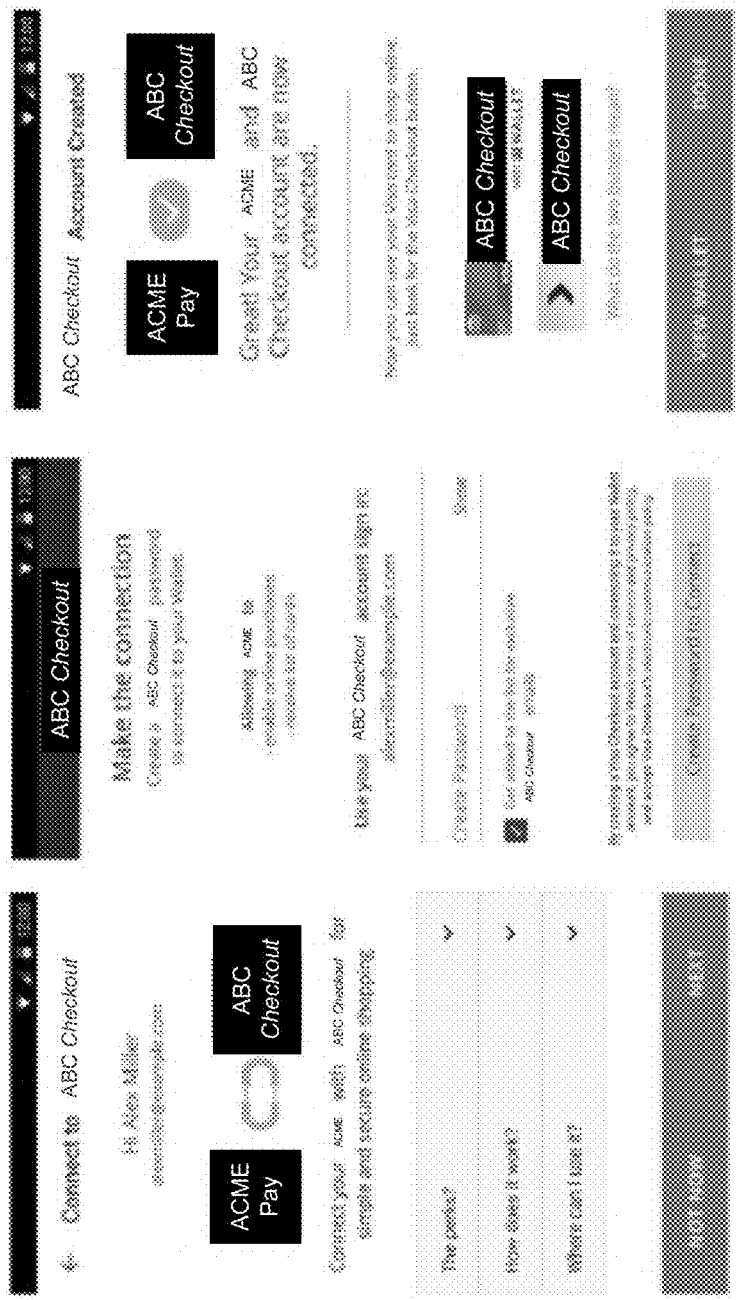
FIG. 14 depicts an illustration of an enrollment process that may be used to link an authentication application to a wallet provider.

FIG. 14 depicts an illustration of an enrollment process that may be used to link an authentication application to a wallet provider. In some embodiments, a user may have an authentication application such as ACME Pay but may not have it linked or otherwise connected to a wallet provider application such as ABC Checkout. In at least some other embodiments, the wallet provider application may not recognize an authentication application. The addition of an authentication application service to a wallet application may be similar to adding another payment device such as a credit card to the wallet provider application.

An example process is illustrated in which ACME Pay (an authentication application) is connected to an existing wallet provider application (ABC Checkout). In the process illustrated in FIG. 14, the user may be presented with imagery associated with both the wallet provider application and the authentication application, each of which may be obtained from a respective remote server supporting that application. In some embodiments, one or more of the user interfaces (UIs) presented in FIG. 14 may be implemented by an authentication application. For example, the user may manually execute an authentication application on his or her mobile device at 1402. Upon execution, the authentication application may detect that the mobile device is associated with a wallet provider account. In this example, the authentication application may subsequently present the option to the user of the mobile device to link the authentication application to the wallet provider application.

The user may select NEXT and the ACME Pay authentication application may be connected to the ABC Checkout wallet provider such that the ACME Pay authentication application may be used to authenticate a user and make payments through the ABC Checkout wallet provider at 1404. In some embodiments, a user may sign in to the ABC Checkout service and elect to create a password to connect the ACME Pay authentication application and the ABC Checkout wallet provider.

Once successfully linked, a confirmation notification may be displayed at 1406. In the illustrations depicted in FIG. 14, the image for ACME Pay, the authentication application, may be retrieved in any of the manners previously discussed. The experience allows the user to seamlessly change the user experience from one authentication application to another within a wallet provider.

The display of the authentication application may also include displaying an image or symbols specific to an authentication application. For example, an authentication application may have a symbol that has meaning that people understand is related to that authentication application. The symbol for the selected authentication application may be displayed. In other situations, the selected authentication application may be indicated by words that indicate the selected authentication application.

Embodiments of the invention provide for a number of advantages. For example, in embodiments of the invention, an authentication application residing outside of a primary or first wallet application may be used to authenticate a user during a transaction conducted with that primary or first wallet application. This allows many external entities including issuers associated with payment accounts of devices in the primary or first wallet application, manufacturers of the computing devices, additional wallet application providers, etc. to perform authentication processing and invoke data security requirements according to the types of transaction being conducted and/or the needs of those external entities.

Embodiments of the disclosure provide for a number of additional technical advantages over conventional systems. For example, the authentication application architecture presented in the disclosure enables a user to use his or her preferred payment options to conduct transactions with a merchant irrespective of whether those payment options are supported by the merchant's payment infrastructure. Additionally, this requires no adjustments to, or even cooperation/approval from, either the merchant or the payment option provider. Accordingly, as new payment options are identified, the only component of the disclosed architecture that needs to be updated to accommodate each new payment option is the wallet provider server computer that supports the wallet application, making updates to the system significantly less costly than updates to conventional systems. Additionally, by providing the wallet applications with the ability to perform their own authentication processes, the disclosed system enables each wallet application to ensure the authentication of each transaction in a manner suited to that wallet application. This increases the overall security of the transaction.

A computer system that may be used to implement any of the entities or components described above. The subsystems that may be included include system bus. Additional subsystems include a printer, keyboard, storage device, and monitor, which are coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus allows the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within one or more computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one," unless specifically indicated to the contrary.

What is claimed is:

1. A method comprising:
   receiving, at a remotely located wallet provider server computer, an indication of a transaction to be completed with respect to a user and a merchant;
   identifying, by the remotely located wallet provider server computer, a number of wallet applications associated with the user and login information for each of the wallet applications, each of the wallet applications comprising wallet services known to be associated with the user which are each provided by at least one separate wallet provider server different from the remotely located wallet provider server computer;
   providing, by the remotely located wallet provider server computer, a list of the identified wallet applications and corresponding graphics associated with each of the wallet applications to a mobile device associated with the user, such that upon selection of a wallet application from the list of wallet applications, the mobile device is caused to initiate the selected wallet application and authenticate the user in accordance with the selected wallet application;
   receiving, by the remotely located wallet provider server computer and from the mobile device, an indication that the user has been authenticated;
   receiving, by the remotely located wallet provider server computer, payment information to be used in completing the transaction;

generating, by the remotely located wallet provider server computer, transaction information based upon the received indication to include the payment information;

determining, by the remotely located wallet provider server computer, a type of data format for the merchant based at least in part on data processing formats associated with the wallet application; and providing, by the remotely located wallet provider server computer, the transaction information according to the type of the data format to the merchant to complete the transaction.

2. The method of claim 1, wherein the number of wallet applications associated with the user is generated by obtaining a set of cookies from the mobile device associated with the user and identifying the number of wallet applications associated with the set of cookies, each cookie of the set of cookies identifying the number of wallet applications associated with the set of cookies, each cookie of the set of cookies including a name for a wallet application of the number of wallet applications for the corresponding cookie and a graphic to be associated with presentation of the wallet application.

3. The method of claim 1, wherein the indication that the user has been authenticated also includes the payment information.

4. The method of claim 1, wherein the mobile device is caused to initiate an authentication application installed on the mobile device to authenticate the user.

5. The method of claim 1, wherein the merchant is associated with a merchant server.

6. The method of claim 5, wherein the indication of the transaction to be completed with respect to the user and the merchant is in response to an interaction by the user with a merchant checkout page associated with the merchant server.

7. The method of claim 1, further comprising receiving, by the remotely located wallet provider server computer and from the mobile device, a token in response to the user being authenticated.

8. The method of claim 1, wherein the indication that the user has been authenticated comprises an authentication cryptogram generated by the mobile device.

9. The method of claim 1, further comprising maintaining, by the remotely located wallet provider server computer, information that maps types of data processing formats utilized by a plurality of merchants, and the types of data processing formats utilized by a plurality of authentication applications or wallet applications.

10. The method of claim 1, wherein the payment information is received in a form of a payment token.

11. The method of claim 1, further comprising requesting, by the remotely located wallet provider server computer, a payment token from a token service computer.

12. The method of claim 11, further comprising transmitting, by the remotely located wallet provider server computer, the payment token to the merchant.

13. The method of claim 1, wherein authenticating the user in accordance with the selected wallet application includes biometric authentication via biometric authentication hardware of the mobile device.

14. The method of claim 1, wherein the number of wallet applications associated with the user are generated further based at least in part on a geographic region associated with the merchant or a type of the transaction.

15. The method of claim 1, wherein initiating the selected wallet application includes pre-populating fields associated with the selected wallet application.

16. The method of claim 1, wherein the payment information is separate from the wallet application.

17. A server computer comprising:

a processor; and a memory including instructions that, when executed with the processor, cause the server computer to at least:

receive, by the server computer, an indication of a transaction to be completed with respect to a user and a merchant, wherein the server computer is a remotely located wallet provider server computer;

identify a number of wallet applications associated with the user and login information for each of the wallet applications, each of the wallet applications comprising wallet services known to be associated with the user which are each provided by at least one separate wallet provider server different from the remotely located wallet provider server computer;

provide a list of the identified wallet applications and corresponding graphics associated with each of the wallet applications to a mobile device associated with the user, such that upon selection of a wallet application from the list of wallet applications, the mobile device is caused to initiate the selected wallet application and authenticate the user in accordance with the selected wallet application;

receive, from the mobile device, an indication that the user has been authenticated;

receive payment information to be used in completing the transaction;

generate transaction information based upon the received indication to include the payment information;

determine a type of data format for the merchant based at least in part on data processing formats associated with the wallet application; and provide the transaction information according to the type of the data format to the merchant to complete the transaction.

18. The server computer of claim 17, wherein the indication that the user has been authenticated also includes the payment information.

19. The server computer of claim 17, wherein the mobile device is caused to initiate an authentication application installed on the mobile device to authenticate the user.

20. A non-transitory computer-readable storage medium storing computer-executable instructions that, when executed by a computer system, configure the computer system to perform operations, comprising:

receiving, by a remotely located wallet provider server computer of the computer system, an indication of a transaction to be completed with respect to a user and a merchant;

identifying a number of wallet applications associated with the user and login information for each of the wallet applications, each of the wallet applications comprising wallet services known to be associated with the user which are each provided by at least one separate wallet provider server different from the remotely located wallet provider server computer;

providing a list of the identified wallet applications and corresponding graphics associated with each of the wallet applications to a mobile device associated with the user, such that upon selection of a wallet application from the list of wallet applications, the mobile device is caused to initiate the selected wallet application and authenticate the user in accordance with the selected wallet application;

receiving, from the mobile device, an indication that the user has been authenticated;

receiving payment information to be used in completing the transaction;

generating transaction information based upon the received indication to include the payment information;

determining a type of data format for the merchant based at least in part on data processing formats associated with the wallet application; and providing the transaction information according to the type of the data format to the merchant to complete the transaction.

\* \* \* \* \*